US012611784B2

(12) United States Patent　　　　(10) Patent No.: US 12,611,784 B2
Liu et al.　　　　　　　　　　　　　　(45) Date of Patent:　Apr. 28, 2026

(54) SOFT GRIPPERS, METHODS OF MAKING THE SAME, SYSTEMS AND METHODS OF CONTROLLING THE SAME

(71) Applicant: Hong Kong Centre for Logistics Robotics Limited, Hong Kong (CN)

(72) Inventors: Yunhui Liu, Hong Kong (CN); Tian Le Pan, Hong Kong (CN); Jiajun An, Hong Kong (CN); Xin Ma, Hong Kong (CN); Jianshu Zhou, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 266 days.

(21) Appl. No.: 18/605,865

(22) Filed: Mar. 15, 2024

(65) Prior Publication Data

US 2025/0187208 A1　　Jun. 12, 2025

Related U.S. Application Data

(60) Provisional application No. 63/608,831, filed on Dec. 12, 2023.

(51) Int. Cl.
| | |
|---|---|
| *B25J 15/06* | (2006.01) |
| *B25J 15/00* | (2006.01) |
| *B65G 47/84* | (2006.01) |
| *B65G 47/91* | (2006.01) |

(52) U.S. Cl.
CPC ....... *B25J 15/0683* (2013.01); *B25J 15/0023* (2013.01); *B65G 47/848* (2013.01); *B65G 47/917* (2013.01); *B25J 15/0616* (2013.01)

(58) Field of Classification Search
CPC ................ B25J 15/0683; B25J 15/0023; B25J 15/0616; B65G 47/917; B65G 2249/045
USPC ................................ 198/468.4, 476.1, 471.1
See application file for complete search history.

(56) References Cited

U.S. PATENT DOCUMENTS

| | | |
|---|---|---|
| 7,207,430 B2 | 4/2007 | Davis et al. |
| 9,120,230 B2 | 9/2015 | Lipson et al. |
| 9,457,477 B1 | 10/2016 | Rublee et al. |
| 9,498,887 B1 | 11/2016 | Zevenbergen et al. |
| | (Continued) | |

FOREIGN PATENT DOCUMENTS

| | | | | |
|---|---|---|---|---|
| EP | 4368354 A1 * | 5/2024 | .......... | B25J 15/0675 |

*Primary Examiner* — James R Bidwell
(74) *Attorney, Agent, or Firm* — EAGLE IP LIMITED

(57) ABSTRACT

In some embodiments, provided is soft grippers, methods of making the same, systems and methods of controlling the same. In one embodiment, the soft gripper comprises a main body comprising a suction cup portion and a neck portion; and a contact membrane, wherein the neck portion comprises a neck chamber and the suction cup portion comprises a suction cup chamber therein, together form a main chamber that is configured to be in gas communication with a first pneumatic source and to receive a jamming material, and wherein the neck portion comprises at least one assisted chambers therein disposed around the neck chamber and configured to be in gas communication with a second pneumatic source. Other example embodiments are described herein. In certain embodiments, provided soft grippers enable seamless transformation between suction gripper configuration and jamming gripper configuration, thereby enhanced grasping capability and versatility.

20 Claims, 27 Drawing Sheets

(56) References Cited

U.S. PATENT DOCUMENTS

| | | | |
|---|---|---|---|
| 9,698,117 B2* | 7/2017 | Ha | H01L 24/75 |
| 10,456,929 B1* | 10/2019 | Miller | B25J 15/0023 |
| 10,953,551 B1* | 3/2021 | Aduh | B25J 15/0023 |
| 2006/0088625 A1* | 4/2006 | Davis | H01L 21/6838 |
| | | | 425/575 |
| 2012/0038180 A1* | 2/2012 | Steltz | B66F 19/00 |
| | | | 294/192 |
| 2021/0122065 A1* | 4/2021 | Pang | B25J 15/0683 |
| 2022/0347842 A1* | 11/2022 | Byars | B07C 5/363 |
| 2023/0321847 A1* | 10/2023 | Sheikholeslami | B25J 15/0052 |
| | | | 294/183 |

* cited by examiner

100A

100B

100B

100D

100C

211

209

210

460

302:On
303:Off
312:On
313:On

302:On
303:On
312:Off
313:On

302:On
303:On
312:On
313:Off

302:On
303:Off
312:On
313:Off 100-6

100-5

100-2

100-3

480

100-3
302:On
303:Off
312:On
313:Off 100-2
302:On
303:On
312:On
313:Off 100-1
302:On
303:On
312:On
313:On 100-6
302:On
303:Off
312:On
313:On

SOFT GRIPPERS, METHODS OF MAKING THE SAME, SYSTEMS AND METHODS OF CONTROLLING THE SAME

CROSS-REFERENCE TO RELATED APPLICATION

This application claims priority to, and the benefits of, U.S. Provisional Application having Ser. No. 63/608,831 filed on Dec. 12, 2023. The entire contents of the foregoing application are hereby incorporated by reference in its entirety for all purposes.

FIELD OF INVENTION

This application relates to robotic devices, and in particular soft grippers, methods of making the same, systems and methods of controlling the same.

BACKGROUND OF INVENTION

The field of robotics has witnessed significant advancements in recent years, particularly in the realm of soft robotics. Soft robotics focuses on the development of flexible and adaptable robotic systems that mimic the dexterity and versatility of biological organisms.

Soft grippers are widely used in the logistics and manufacturing industries to manipulate objects of various shapes and sizes. However, existing soft grippers often have limitations in their ability to handle objects of varying sizes. For example, a suction gripper can only attach objects with a contact surface smaller than the working face of the suction cup, and a jamming gripper cannot grasp objects larger than the jamming cavity of the gripper. There is an urgent need to develop grippers with enhanced grasping capability in that they are capable of handling objects with varying shapes, sizes, and materials.

SUMMARY OF INVENTION

In light of the foregoing background, in certain embodiments, it is an object to provide a novel soft gripper structure with a transformation mechanism.

In some embodiments, the novel soft gripper structure that incorporates a transformation mechanism, enabling seamless switching between suction gripper and jamming gripper configurations. In some embodiments, the gripper structure is fabricated using a silicone rubber casting process with a set of molds, ensuring uniform material distribution and enhanced durability. In some embodiments, a pneumatic control system enables the gripper to transform between the suction gripper configuration and the jamming gripper configuration. In some embodiments, through the integration of these components, the invented gripper structure, fabrication method, and control system enable the creation of a soft gripper capable of two grasping forms (jamming form and suction form) and the seamless transformation between the two forms. In some embodiments, this application seeks to protect the unique features and innovative aspects of the gripper structure, fabrication method, and control method, providing exclusive rights and recognition for their utility in industries such as logistics and manufacturing.

In some embodiments, the application introduces a soft gripper structure that incorporates a transformation mechanism, enabling it to switch between a suction gripper configuration and a jamming gripper configuration. In some embodiments, the fabrication method of this gripper is developed, and it is complemented by a pneumatic control system along with corresponding methods to achieve transformations between different gripper configurations. In some embodiments, the soft gripper can transform into a suction gripper configuration to attach and detach objects with a contact surface larger than the working face of the suction cup. In some embodiments, it can also transform into a jamming gripper configuration to attach and detach objects with a contact surface smaller than the working face of the suction cup. In some embodiments, 3D-printed molds and casting techniques are utilized to fabricate the soft gripper. In some embodiments, the pneumatic control system enables the activation of the soft gripper's corresponding structures in a specific sequence, allowing it to achieve transformation between the two gripper configurations.

In some embodiments, provided is a soft gripper having a proximal side and a distal side, comprising: a main body comprising a suction cup portion that comprises an open end at the proximal side; and a neck portion that is connected with or extended from the suction cup portion; and a contact membrane, configured to seal the open end, wherein the neck portion comprises a neck chamber therein and the suction cup portion comprises a suction cup chamber therein, the neck chamber and the suction cup chamber together form a main chamber that is configured to be in gas communication with a first pneumatic source and to receive a jamming material, and wherein the neck portion further comprises at least one assisted chambers therein, each are disposed around the neck chamber and configured to be in gas communication with a second pneumatic source.

In some embodiments, provided is a fabrication method of the soft gripper as described in any one of the preceding embodiments, comprising the following steps: (1) providing a main body mold sized and shaped to form the main body and curing a first flexible material into the main body mold, thereby forming the main body; (2) providing a membrane mold sized and shaped to form the contact membrane and curing a second flexible material into the membrane mold, thereby forming the membrane; and (3) attaching the contact membrane to the main body, thereby forming the soft gripper.

In some embodiments, provided is a pneumatic system for controlling the soft gripper as described in any one of the preceding embodiments, comprising: an assisted chamber control system, comprising: a second pneumatic source, configured to provide a second pressure; a first valve connected between outlet of the second pneumatic source and the at least one assisted chambers; and a second value connected between inlet of the second pneumatic source and the at least one assisted chambers; and a main chamber control system, comprising: a first pneumatic source configured to provide a first pressure; a third valve connected between outlet of the first pneumatic source and the main chamber; and a fourth value connected between inlet of the first pneumatic source and the main chamber.

In some embodiments, provided is a method of controlling the soft gripper as described in any one of the preceding embodiments using the pneumatic system as described herein, comprising one or more of the steps of: (i) grasping a target object in a jamming attachment configuration; (ii) grasping a target object in a suction attachment configuration; (iii) transforming from the jamming attachment configuration to the suction attachment configuration; and/or (iv) transforming from the suction gripper configuration to the jamming gripper configuration.

There are many advantages of the present disclosure. In some embodiments, this mechanism enables the gripper to seamlessly transform between a suction gripper configuration and a jamming gripper configuration, thereby harnessing the respective advantages of both suction and jamming methods within a single gripper structure. In some embodiments, the suction gripper configuration allows for the creation of a vacuum seal, enabling secure grasping of flat and smooth objects. In contrast, in some embodiments, the jamming gripper configuration utilizes granular materials to conform to the shape of objects, facilitating effective manipulation of irregularly shaped or porous objects. In some embodiments, the ability to switch between the suction gripper and jamming gripper configurations empowers the soft gripper to adapt to a wider range of objects, making it suitable for diverse tasks in industries such as logistics and manufacturing. Overall, in some embodiments, the invention of this soft gripper structure with a transformation mechanism addresses the limitations of existing grippers and offers a novel engineering solution with enhanced grasping capability.

BRIEF DESCRIPTION OF FIGURES

FIG. 5D is a perspective view of an example soft gripper with a transformation mechanism in ellipse shape, according to yet another example embodiment.

FIG. 5E is a bottom view of an example soft gripper with a transformation mechanism in ellipse shape, according to the same example embodiment of FIG. 5D.

DETAILED DESCRIPTION

Definitions

Figure 1A:
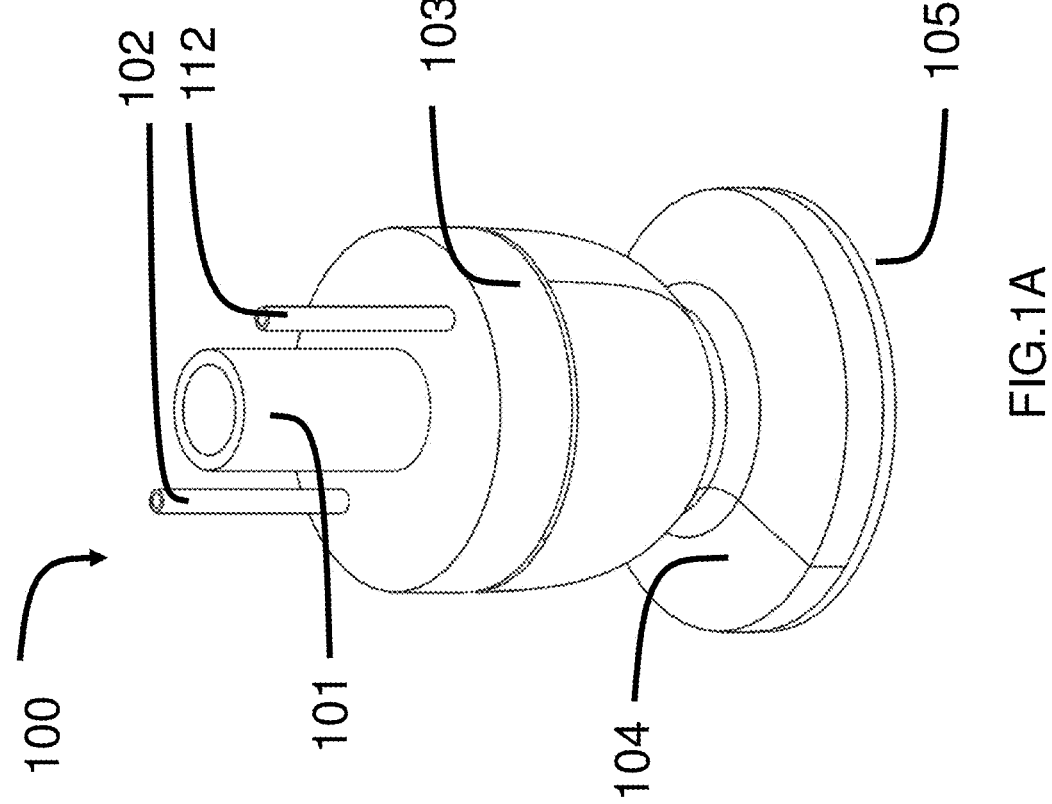
FIG. 1A is a perspective view of an example soft gripper with a transformation mechanism, according to an example embodiment.

As used herein and in the claims, the terms "comprising" (or any related form such as "comprise" and "comprises"), "including" (or any related forms such as "include" or "includes"), "containing" (or any related forms such as "contain" or "contains"), means including the following elements but not excluding others. It shall be understood that for every embodiment in which the term "comprising" (or any related form such as "comprise" and "comprises"), "including" (or any related forms such as "include" or "includes"), or "containing" (or any related forms such as "contain" or "contains") is used, this disclosure/application also includes alternate embodiments where the term "comprising", "including," or "containing," is replaced with "consisting essentially of" or "consisting of". These alternate embodiments that use "consisting of" or "consisting essentially of" are understood to be narrower embodiments of the "comprising", "including," or "containing," embodiments.

For the sake of clarity, "comprising", "including", "containing" and "having", and any related forms are open-ended terms which allows for additional elements or features beyond the named essential elements, whereas "consisting of" is a closed end term that is limited to the elements recited in the claim and excludes any element, step, or ingredient not specified in the claim.

As used herein, the singular forms "a", "an" and "the" are intended to include the plural forms as well, unless the context clearly indicates otherwise. Where a range is referred in the specification, the range is understood to include each discrete point within the range. For example, 1-7 means 1, 2, 3, 4, 5, 6, and 7.

As used herein, the term "about" is understood as within a range of normal tolerance in the art and not more than ±10% of a stated value. By way of example only, about 50 means from 45 to 55 including all values in between. As used herein, the phrase "about" a specific value also includes the specific value.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" cylindrical shape would mean that the object has either an exact cylindrical shape or a nearly exact cylindrical shape. In another example, an object that is "substantially" perpendicular to a surface would mean that the object is either exactly perpendicular to the surface or nearly exactly perpendicular to the surface, e.g., has a 5% deviation.

It is to be understood that terms such as "top", "bottom", "middle", "side", "length", "inner", "outer", "interior", "exterior", "outside", "vertical", "horizontal" and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

As used herein, the term "connect", "connecting", "connected", "connection" means directly or indirectly physically bound to other elements.

As used herein, the term "gripper" refers to a device that is designed to grip or grasp and hold one or more target objects. In some examples, the gripper may be made of soft materials and is transformable in different states, and can be called as "soft gripper" or "transformable soft gripper".

As used herein, the term "soft" refers to a property of a material which is flexible and at least partially deformable.

As used herein, the term "in gas communication" refers to a connection between two components such that at least one gas can flow through from one component to another.

As used herein, the term "main body" refers to a main component of a soft gripper that contains a neck portion and a suction cup portion. In some examples, the main body is made of one or more flexible material(s).

As used herein, the term "main chamber" refers to a space or cavity defined in the main body, which contains or forms from a neck chamber and a suction cup chamber. In some examples, the main chamber is configured to receive one or more jamming materials and is in gas communication with a pneumatic source.

As used herein, the term "assisted chamber(s)" refers to a space(s) or cavity(ies) defined in the neck portion that are disposed around the neck chamber and in gas communication with a pneumatic source.

As used herein, the term "suction cup portion" refers to a component of the main body that defines a suction cup chamber therein, providing a working face for at least a suction gripper configuration.

As used herein, the term "neck portion" refers to a component of the main body connecting with or extended from the suction cup portion. In some examples, the neck portion contains a neck chamber and one or more assisted chambers.

As used herein, the term "contact membrane" refers to a flexible film or sheet that substantially covers and seals the open end of the suction cup portion to form the main chamber.

As used herein, the term "jamming material" refers to a material that is used in soft grippers based on the principle of jamming. By way of example, jamming material is in the form of jamming granules, powder, beads etc.

As used herein, the term "valve" refers to device or component that controls the flow of fluids (e.g., liquids, or gases) by opening, closing, or partially obstructing passages within a system, allowing for regulation, isolation, or direction of the flow. By way of example, the valve is an electric valve controlling air pressure in the pneumatic system.

As used herein, the term "pneumatic system" is a controlling system that uses compressed gas (e.g., air) as a medium to transmit and control pressure(s) asserted to the soft gripper. By way of example, pneumatic system includes one or more components such as air compressor(s), pneumatic actuator(s), valve(s), pressure gauge(s), air filter(s), regulator(s), and air tubes etc.

As used herein, the term "pneumatic source" is or contains a device (e.g. compressor(s)) that pumps a compressed gas (e.g., air) and contains mean(s) (e.g. valve(s)) to control flow and/or pressure(s) of the compressed gas.

As used herein, the term "transformable" refers to an element that is capable of undergoing a change in form, shape, and/or configuration. By way of example, a transformable soft gripper contains various components that have the ability to be transformed or altered into different states or configurations, such as jamming configuration and suction configuration.

As used herein, the terms "suction configuration" or "suction gripper configuration" refer to a status of the soft gripper that is configured to attach and detach objects by suction mechanism. By way of example, the suction gripper configuration allows for the creation of a vacuum seal, enabling secure grasping objects such as flat and smooth objects that may (or may not) have a contact surface larger than the working face of the suction cup.

As used herein, the terms "jamming configuration" or "jamming gripper configuration" refer to a status of the soft gripper that is configured to attach and detach objects by jamming mechanism. By way of example, the jamming gripper configuration utilizes granular materials to conform to the shape of objects, facilitating effective manipulation of objects such as irregularly shaped or porous objects.

Although the description referred to particular embodiments, the disclosure should not be construed as limited to the embodiments set forth herein.

Embodiments of the Present Invention

Embodiment 1

In some embodiments, the novel soft gripper structure that incorporates a transformation mechanism, enabling seamless switching between suction gripper and jamming gripper configurations. In some embodiments, the gripper structure is fabricated using a silicone rubber casting process with a set of molds, ensuring uniform material distribution and enhanced durability. In some embodiments, a pneumatic control system enables the gripper to transform between the suction gripper configuration and the jamming gripper configuration. In some embodiments, through the integration of these components, the invented gripper structure, fabrication method, and control system enable the creation of a soft gripper capable of two grasping forms (jamming form and suction form) and the seamless transformation between the two forms. In some embodiments, this application seeks to protect the unique features and innovative aspects of the gripper structure, fabrication method, and control method, providing exclusive rights and recognition for their utility in industries such as logistics and manufacturing.

In some embodiments, the application introduces a soft gripper structure that incorporates a transformation mechanism, enabling it to switch between a suction gripper configuration and a jamming gripper configuration. In some embodiments, the fabrication method of this gripper is developed, and it is complemented by a pneumatic control system along with corresponding methods to achieve transformations between different gripper configurations. In some embodiments, the soft gripper can transform into a suction gripper configuration to attach and detach objects with a contact surface larger than the working face of the suction cup. In some embodiments, it can also transform into a jamming gripper configuration to attach and detach objects with a contact surface smaller than the working face of the suction cup. In some embodiments, 3D-printed molds and casting techniques are utilized to fabricate the soft gripper. In some embodiments, the pneumatic control system enables the activation of the soft gripper's corresponding structures in a specific sequence, allowing it to achieve transformation between the two gripper configurations.

EXAMPLES

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Example 1

Figure 1B:
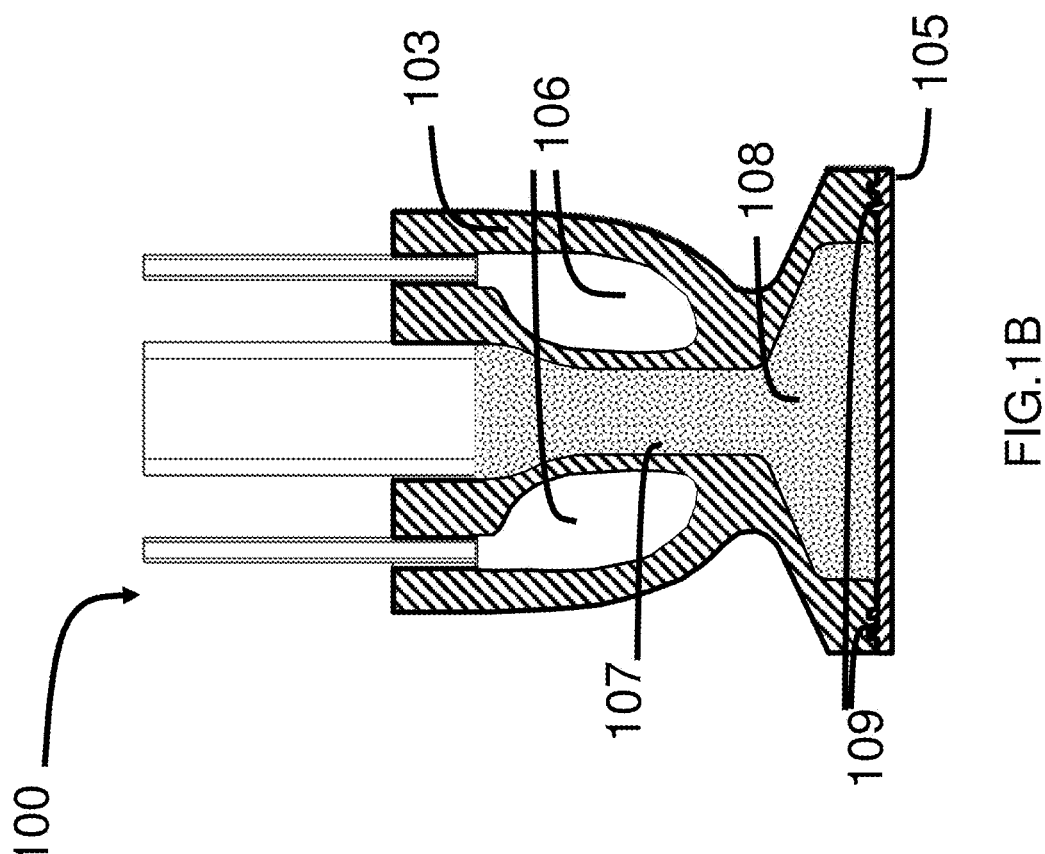
FIG. 1B is a cross sectional view of an example soft gripper with a transformation mechanism, according to the same embodiment of FIG. 1A.

Now referring to FIGS. 1A-1B, the transformable soft gripper structure 100 contains a main chamber air tube 101, two assisted chamber air tubes 102 and 112, a main body 103, a suction cup 104, and a contact membrane 105. Details of each component are described as below:

A main chamber air tube 101. It is a soft tube that connects with the main chamber 107.

Two assisted chamber air tubes 102 and 112. It is a soft tube that connects with the assisted chambers 106.

A main body 103. The main chamber 107 has a cylindrical cavity that aligns with the central axis of the main body 103. Another two cavities symmetrically aligned against the main chamber 107 are two assisted chambers 106 in FIG. 1B. Each of the assisted chambers 106 has a narrow upper opening and a large lower space. Hence, the upper wall between the main chamber 107 and the assisted chambers 106 are much thicker than the lower wall. The main chamber 107 is filled with jamming granule 108. By way of example, the main body 103 is made of flexible materials such as rubber, silicone rubber (such as Dragon Skin 0030 or Dragon Skin 0010) or RTV Silicone rubber or combination thereof.

A suction cup 104. It is connected to the bottom of the main body 103. It is a flexible, concave-shaped cup. The overall shape is akin to a cone with a vertical extension in the widened direction of the cone. The narrower side is connected to the main chamber 107. On the bottom edge surface of the suction cup portion, there are two small grooves 109. These two grooves serve to increase the connection strength between the contact membrane 105 in FIG. 1B.

A contact membrane 105. It is a soft, thin film that seals the bottom of the suction cup 104. The contact membrane 105 can have a variety of patterns or designs on its surface, including raised dots, recessed pits, and coatings of different materials. By way of example, the contact membrane 105 is made of flexible materials such as silicone rubber such as Ecoflex 0030 or Ecoflex 0010. In some embodiments, the flexible materials of contact membrane is more flexible than that of the main body. By way of example, the membrane casting material can be dopamine based adhesive nanocoatings or hyaluronic acid hydrogel adhesive, or combination thereof.

Figure 1C:
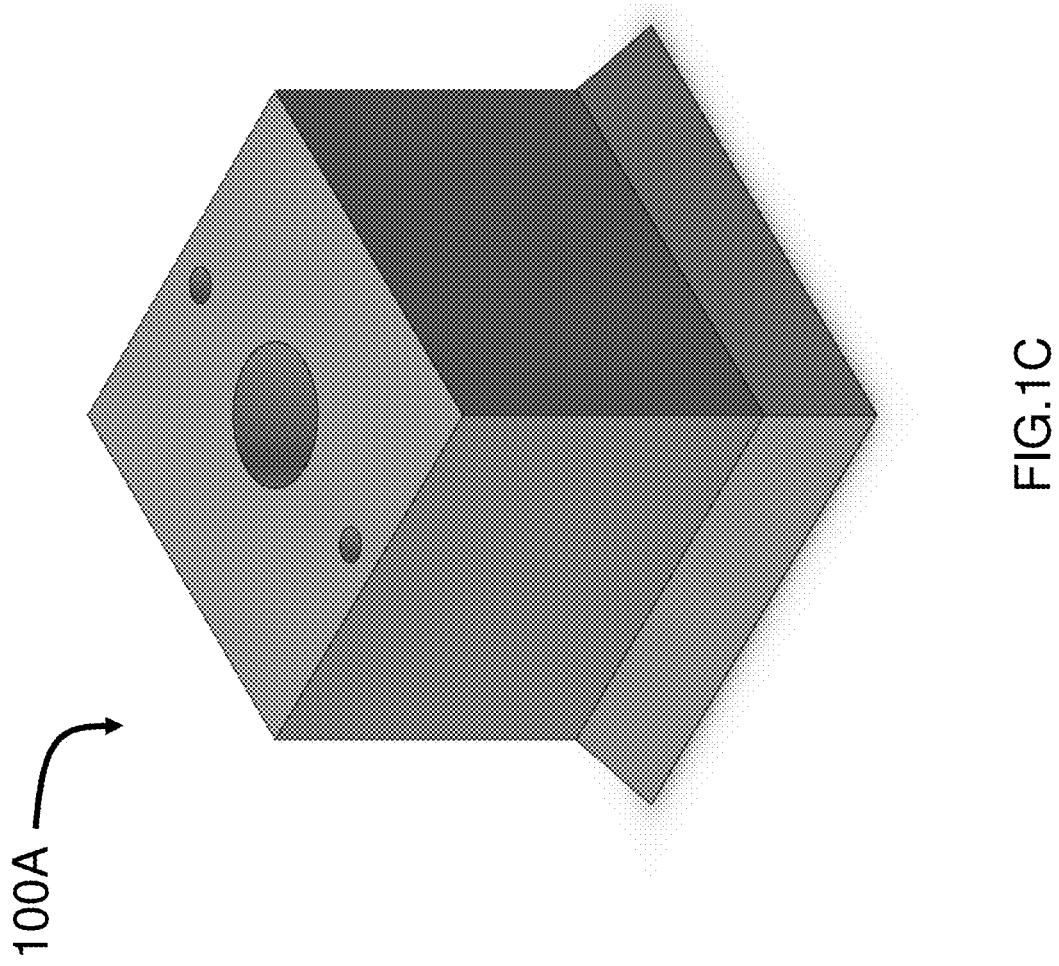
FIG. 1C is a perspective view of an example soft gripper with a transformation mechanism in square shape, according to another example embodiment.
Figure 1E:
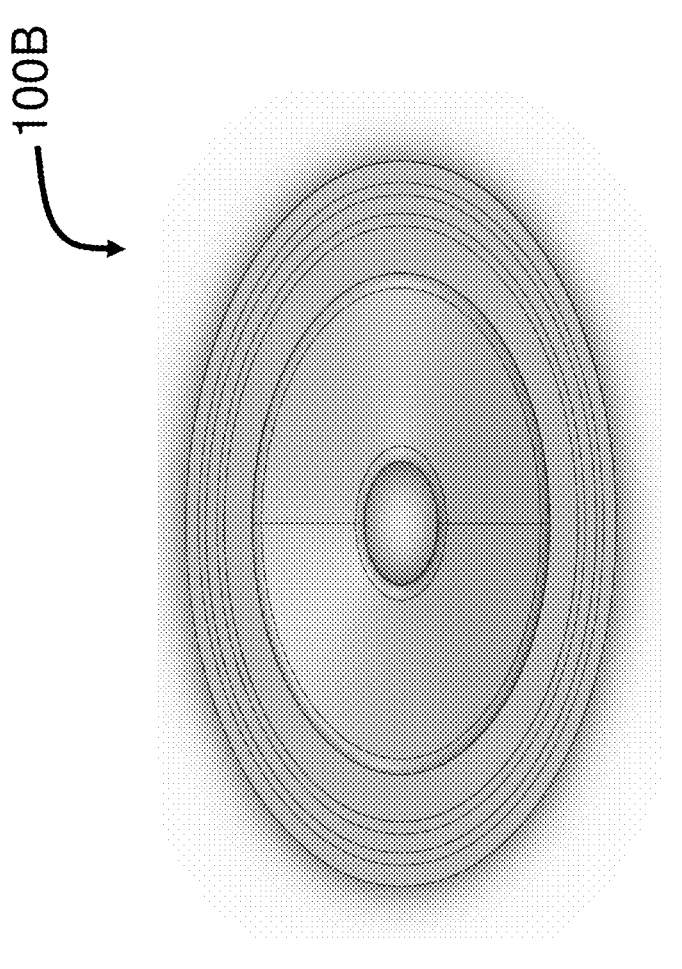
FIG. 1E is a bottom view of an example soft gripper with a transformation mechanism in ellipse shape, according to the same example embodiment of FIG. 1D.
Figure 1D:
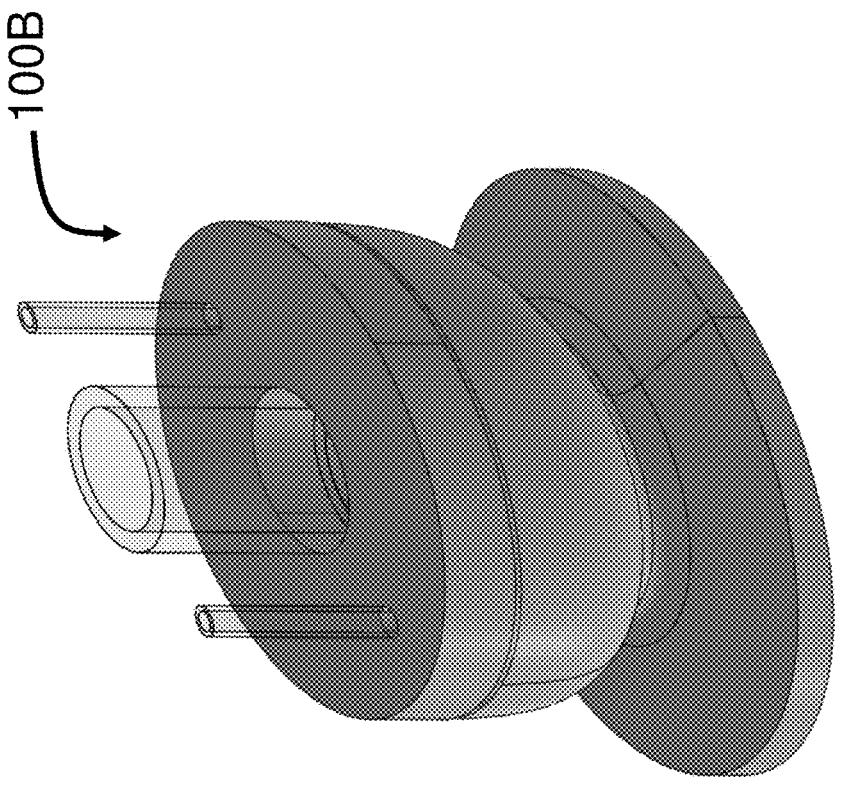
FIG. 1D is a perspective view of an example soft gripper with a transformation mechanism in ellipse shape, according to another example embodiment.

The transformable soft gripper 100 in FIGS. 1A-1B has a generally circular transverse cross-section. Now referring to FIGS. 1C-1E, showing another example transformable soft gripper structure 100A with square cross-section and another example transformable soft gripper structure 100B with ellipse cross-section.

Figures 1F, 1G:
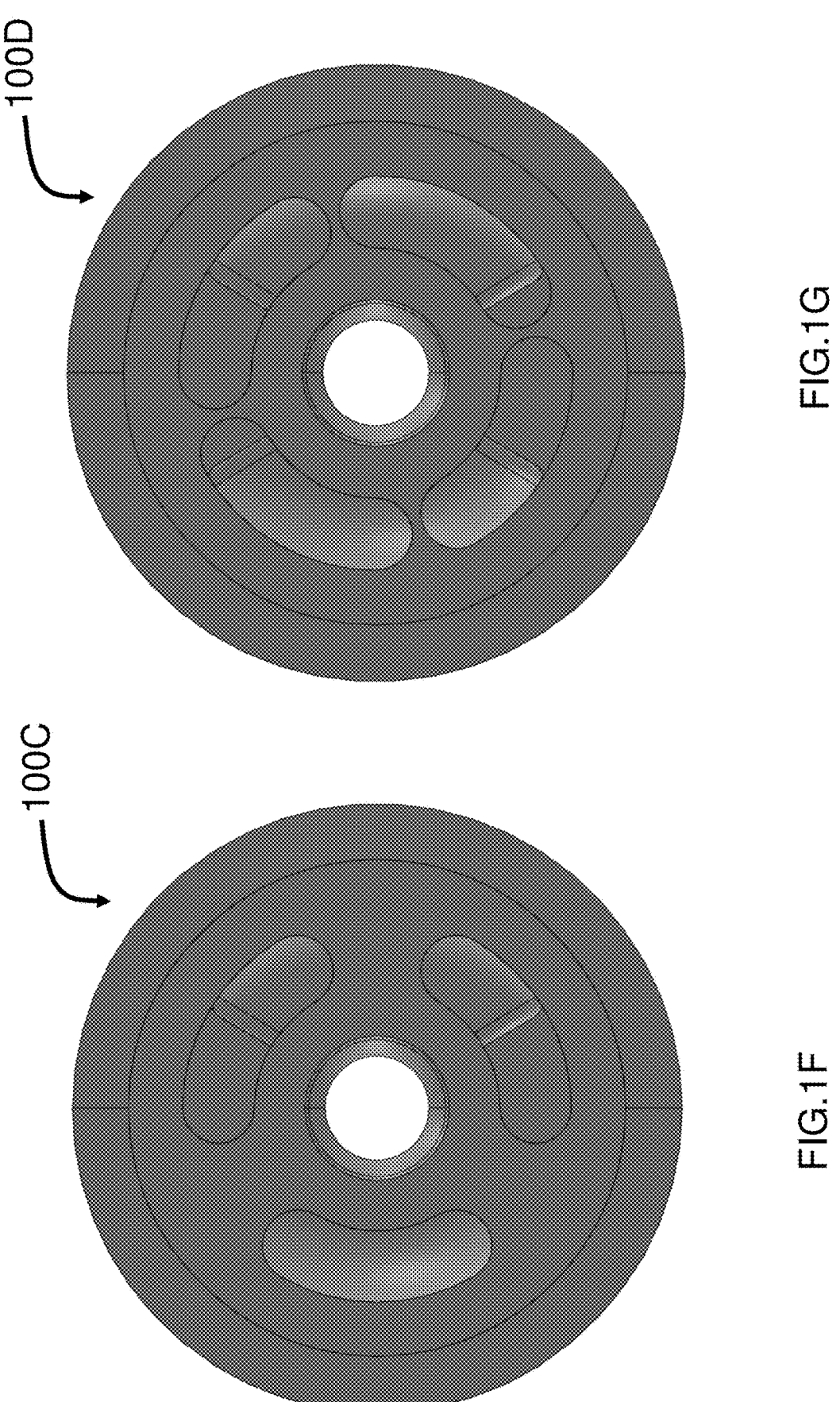
FIG. 1F is a schematic cross-sectional view of an example soft gripper with three assisted chambers, according to another example embodiment.
FIG. 1G is a schematic cross-sectional view of an example soft with four assisted chambers, according to another example embodiment.

Now referring to FIGS. 1F-1G, the example transformable soft gripper structure 100 include more than one assisted chambers 106. The example transformable soft grippers include three assisted chambers (100C) and four assisted chambers (100D), respectively.

Example 2

Figure 2A:
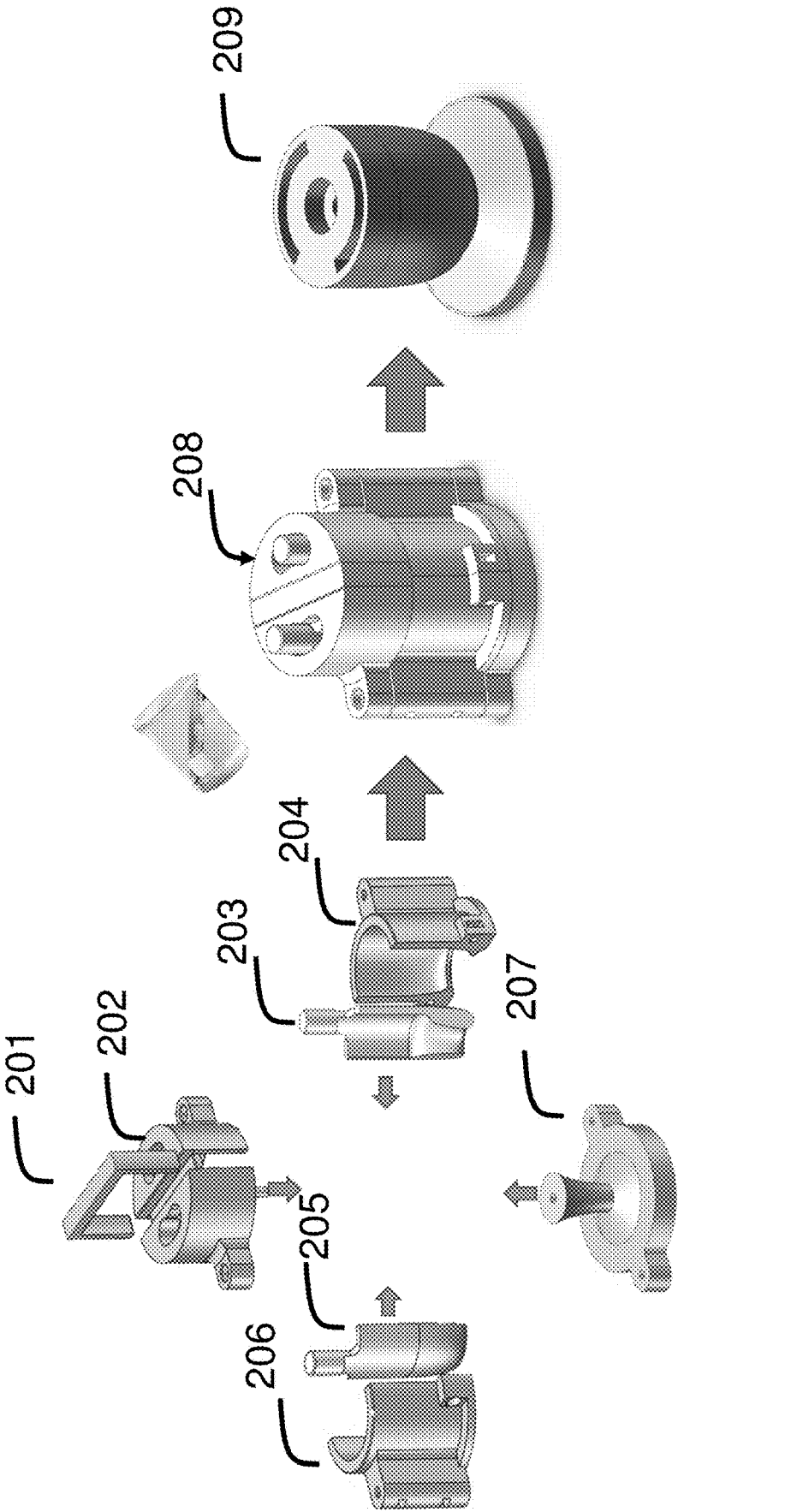
FIGS. 2A-2C are schematic diagrams of an example fabrication method of the soft gripper, according to an example embodiment.
Figure 2B:
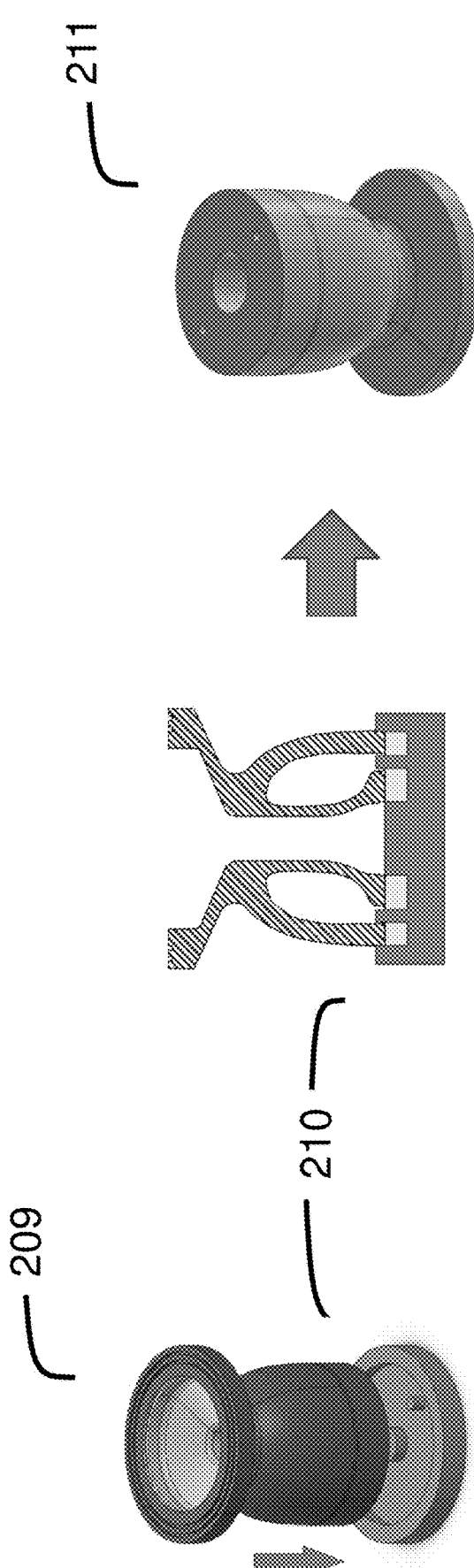
Figure 2C:
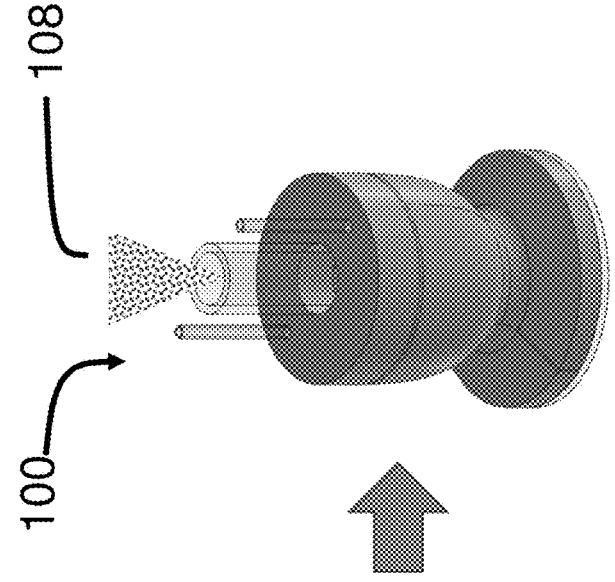
Figure 2C:
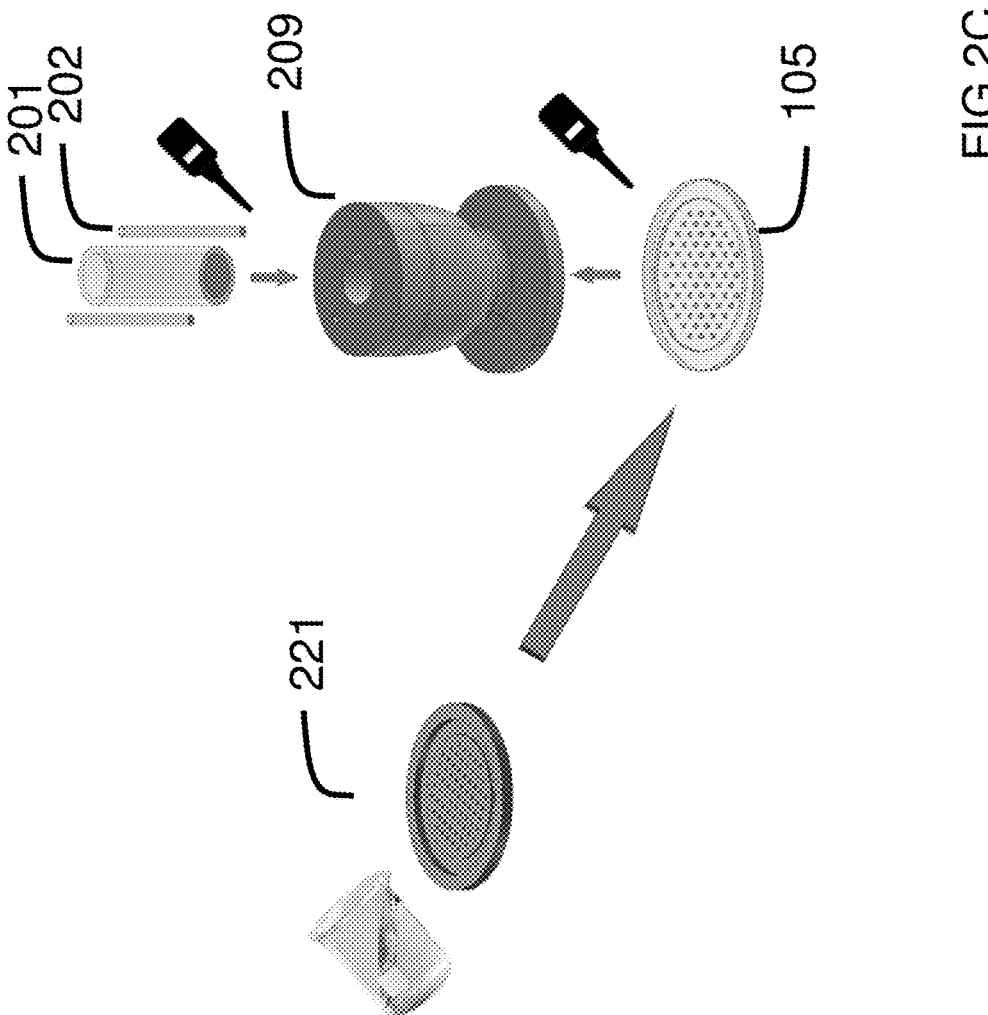

Now referring to FIGS. 2A-2C, to fabricate the transformable soft gripper structure 100, an example fabrication method is provided with the following steps:

Step 1: Assemble the 3D-printed top fixer 202, the 3D-printed close cap 201, the 3D-printed left outer shell 206, the 3D-printed left inner shell 205, the 3D-printed right outer shell 204, the 3D-printed right inner shell 203, and the 3D-printed base mold 207 to make a completed mold 208. Then pour silicone gel via the top opening of the top fixer 202 and let the mold 208 sit in the vacuum environment for degassing. After degassing, remove the mold 208 from vacuum environment. Let mold 208 sit for curing to allow silicone rubber to cure the main body 209. Then, remove mold 208.

Step 2: Fill mold 210 with silicone rubber. Place the filled mold 210 in a vacuum environment and let it sit for degassing. After degassing, remove the mold 210 from the vacuum environment and fit the upper side of the main body 209 to the bottom of mold 210. Let them sit for curing to allow the silicone rubber to cure a cap for the main body 209 and become the new main body 211. Then, remove mold 210 from the main body 211.

Step 3: Fill mold 221 with soft silicone rubber, put it in a vacuum environment, and let it sit for degassing. After degassing, remove the mold 221 from the vacuum chamber and let it sit curing to allow the silicone rubber to cure the contact membrane 105. Then, adhere the contact membrane 105 to seal the bottom opening of the main body 209 with silicone rubber adhesive. Adhere the main chamber air tube 101 and two assisted chamber air tubes 102 and 112 onto the top opening of the main body 209 with silicone rubber adhesive. After filling certain amounts of jamming granule 108 to the main chamber air tube 101, the transformable soft gripper 100 is fabricated.

Example 3

Figure 3:
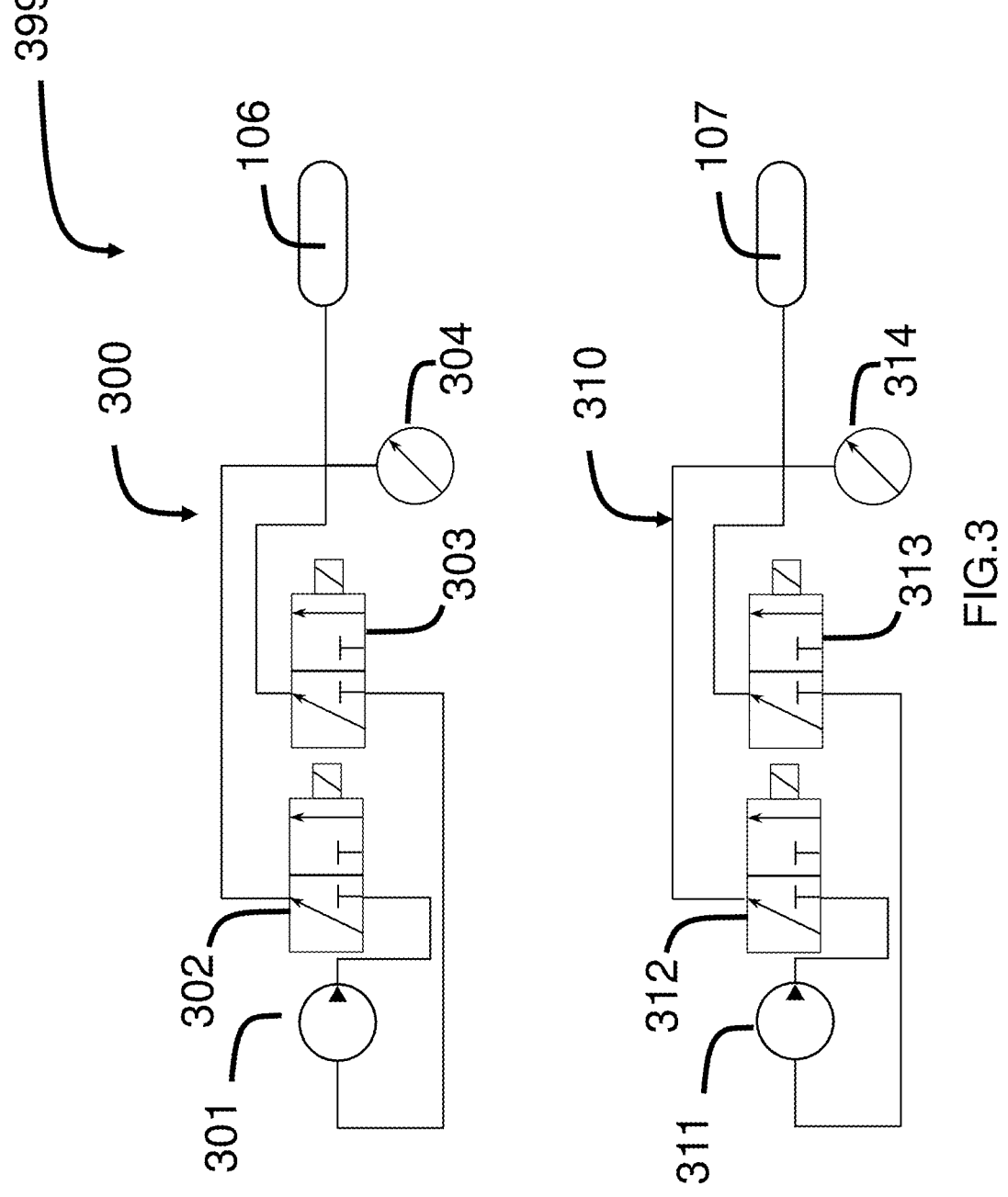
FIG. 3 is a schematic diagram of an example pneumatic control system for controlling the soft gripper, according to an example embodiment.

Now referring to FIG. 3, the example pneumatic control system 399 for controlling the transformable soft gripper 100 contains two control sets, the assisted chambers control set 300 and the main chamber control set 310.

In the assisted chamber control set 300, the outlet of compressor 301 is connected to the 2/3-way electric valve 302, and the inlet of the compressor 301 is connected to the 2/3-way electric valve 303. When valve 302 is in "On" status and valve 303 is in "Off" status, compressor 301 can pump air from the surroundings and transmit positive pressure to the assisted chambers 106. This inflation causes the assisted chambers 106 to expand towards the main chamber, effectively preventing jamming granule 108 from passing through the main chamber 107. When valve 302 is in "Off" status and valve 303 is in "On" status, compressor 301 can pump air to the surroundings, creating a negative pressure within the assisted chamber 106. This deflation leads to the assisted chambers 106 contracting, allowing materials to pass through the main chamber 107. When both valve 302 and valve 303 are in the "Off" status, the pressure within the assisted chambers 106 is locked. When both valves are set to "On", the pressure within the assisted chambers 106 is equal to atmospheric pressure.

In the main chamber control set 310, the outlet of compressor 311 is connected to the 2/3-way electric valve 312, and the inlet of the compressor 311 is connected to the 2/3-way electric valve 313. When valve 312 is in "On" status and valve 313 is in "Off" status, compressor 311 can pump air from the surroundings and transmit positive pressure to the main chamber 107, causing the contact membrane 105 to inflate outward. When valve 312 is in "Off" status and valve 313 is in "On" status, compressor 311 can pump air to the surroundings and transmit negative pressure to the main chamber 107, causing the contact membrane 105 to deflate inward. When both valve 312 and valve 313 are in the "Off" status, the pressure in the main chamber 107 is locked. When both valves are in the "On" status, the pressure within the main chamber 107 is equal to atmospheric pressure.

Example 4

Now referring to FIGS. 4A-4D, under the control of a pneumatic system (such as the example system 399 as described in EXAMPLE 3), the transformable soft gripper 100 can perform four functions: (1) jamming attachment 420 for grasping objects smaller than the gripper, (2) suction attachment 440 for grasping objects larger than the gripper, (3) transformation from jamming gripper configuration to suction gripper configuration (transformation 460), and (4) transformation from suction gripper configuration to jamming gripper configuration (transformation 480).

Figure 4A:
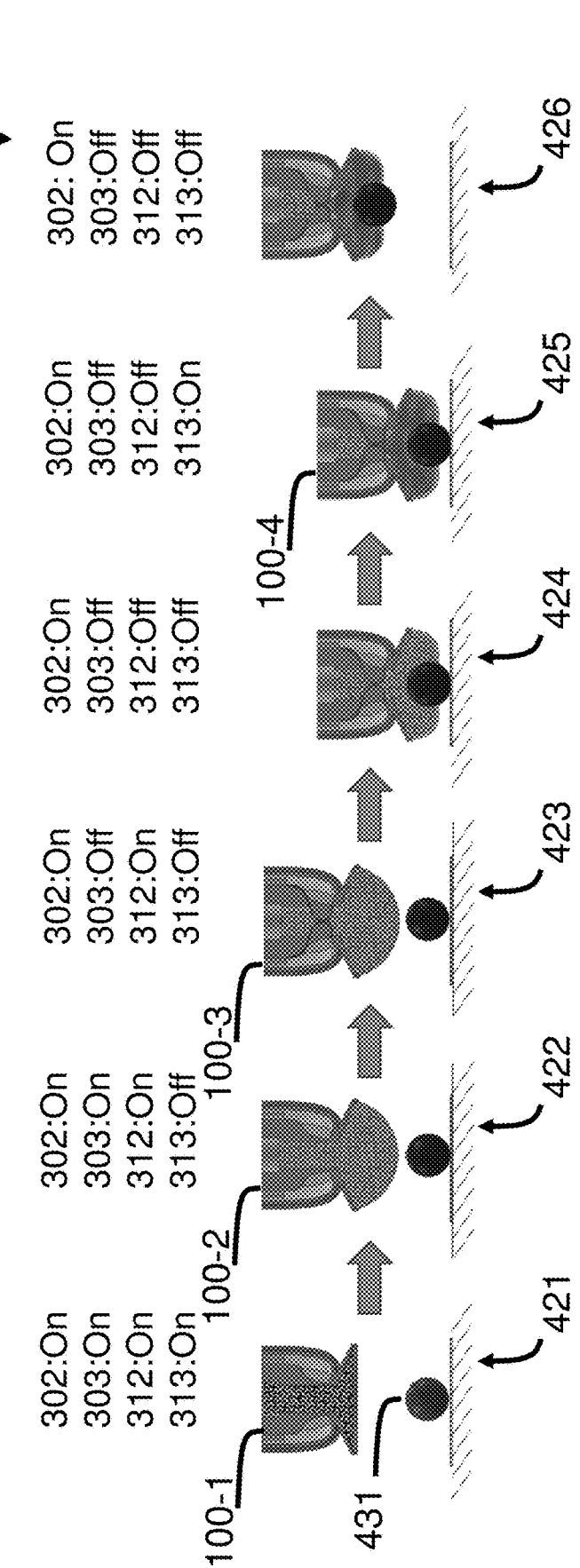
FIGS. 4A-4D are schematic diagrams of an example controlling scheme of the soft gripper in jamming attachment configuration, suction attachment configuration, transformation from jamming gripper configuration and transformation from suction gripper configuration to jamming gripper configuration, respectively, using an example pneumatic control system, according to an example embodiment.

Now referring to FIG. 4A, to achieve jamming attachment 420, a series of actions are executed by the pneumatic system. Firstly, during jamming stage 421, the valves 302, 303, 312, 313 are all in "On" status, and the gripper 100 is in its resting status 100-1, positioned atop a small target 431. Next, in the jamming stage 422, by changing valve 313 to "Off" status, positive pressure is transmitted to the main chamber 107, causing the contact membrane 105 to inflate outward. As a result, the jamming granule 108 drops into the expanded space, transforming the gripper 100 from status 100-1 to status 100-2. Then, in jamming stage 423, valve 303 is turned to "Off" status, causing the assisted chamber 106 to inflate toward the main chamber. This inflation prevents the jamming granule 108 from flowing back to the main chamber 107. This transforms the gripper 100 to status 100-3. In jamming stage 424, the gripper 100 descends toward target 431 until the target is fully surrounded by the jamming granule 108. In jamming stage 425, valve 313 is turned to "On" status, creating negative pressure in the main chamber 107. This compresses the jamming granule 108 towards the target 431, making the transformation of the gripper to status 100-4. Finally, in jamming stage 426, valve 313 is turned to "Off" status and target 431 is attached to the gripper 100, completing the jamming attachment and allowing the gripper to manipulate the small object effectively.

Figure 4B:
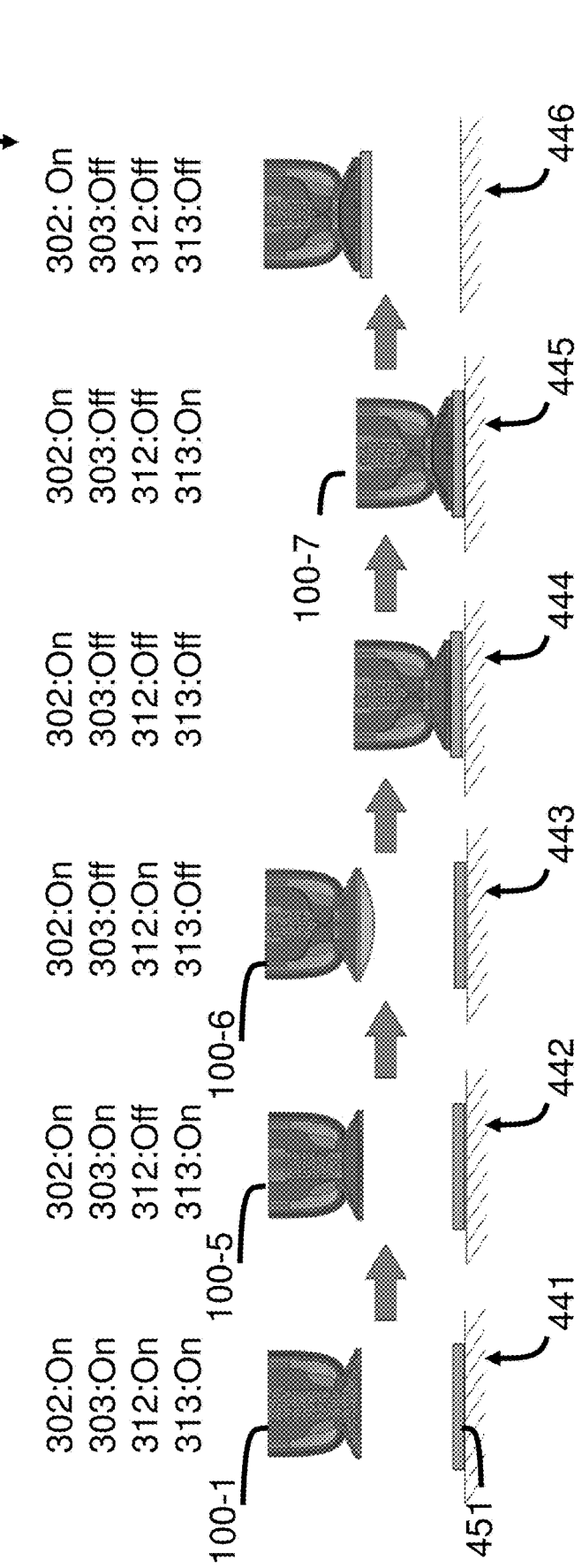

Now referring to FIG. 4B, to achieve suction attachment 440, a series of actions are undertaken by the pneumatic system. Firstly, during the suction stage 441, the valves 302, 303, 312, 313 are all set to "On" status, and the gripper 100 is in its resting status 100-1, positioned atop a large target 8207. Then, in the following suction stage 442, by changing valve 312 to "Off", negative pressure is applied to the main chamber 107, causing the contact membrane 105 to deflate inward. This action pushes the jamming granule 108 into the main chamber 107, transforming the gripper 100 from status 100-1 to status 100-5. Next, in suction stage 443, valve 303 and valve 313 are turned to "Off", while valve 312 is set to "On". The assisted chambers 106 inflate toward the main chamber, preventing the jamming granule 108 from falling back into the suction cup 104. The contact membrane inflates outward with a relatively small pressure, transforming the gripper 100 to status 100-6. In suction stage 444, gripper 100 descends towards target 8207 until the target is fully contacted by membrane 105. In suction stage 445, valve 313 is turned to "On", creating negative pressure in the main chamber 107. This forms a vacuum space between the contact membrane 105 and the target 8207, transforming the gripper 100 to status 100-7. Finally, in suction stage 446, valve 313 is switched to "Off" and the target 8207 is securely attached to the gripper 100, completing the suction attachment and enabling the gripper to manipulate the large object effectively.

Figure 4C:
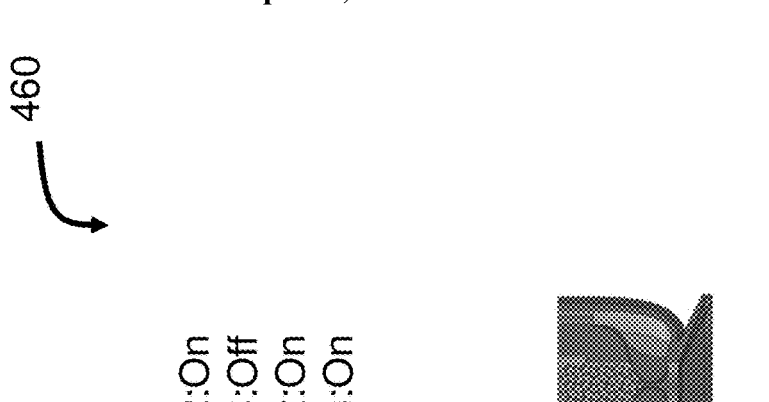

Now referring to FIG. 4C, to achieve the transformation from jamming gripper configuration to suction gripper configuration (transformation 460), a series of actions are carried out by the pneumatic system. Firstly, the gripper is in a jamming status 100-3, with valve 302 in "On" status, valve 303 in "Off" status, valve 312 in "On" status, and valve 313 in "Off" status. Then, valve 303 is switched to "On", allowing the assisted chamber to create a passage for the jamming granule 108, and the gripper 100 transforms from status 100-1 to status 100-2. Next, valve 312 turns to "Off" status, and valve 313 turns to "On" status. Negative pressure is applied to the main chamber 107, causing the contact membrane 105 to deflate inward, which leads to the jamming granule 108 being pushed to the main chamber 107. Consequently, the gripper 100 transforms from status 100-2 to status 100-5. Finally, valve 303 is turned to "Off" status while valve 312 is turned to "On" status. The gripper 100 transforms from status 100-5 to status 100-6. At this point, the gripper 100 is ready for suction-based grasping.

Figure 4D:
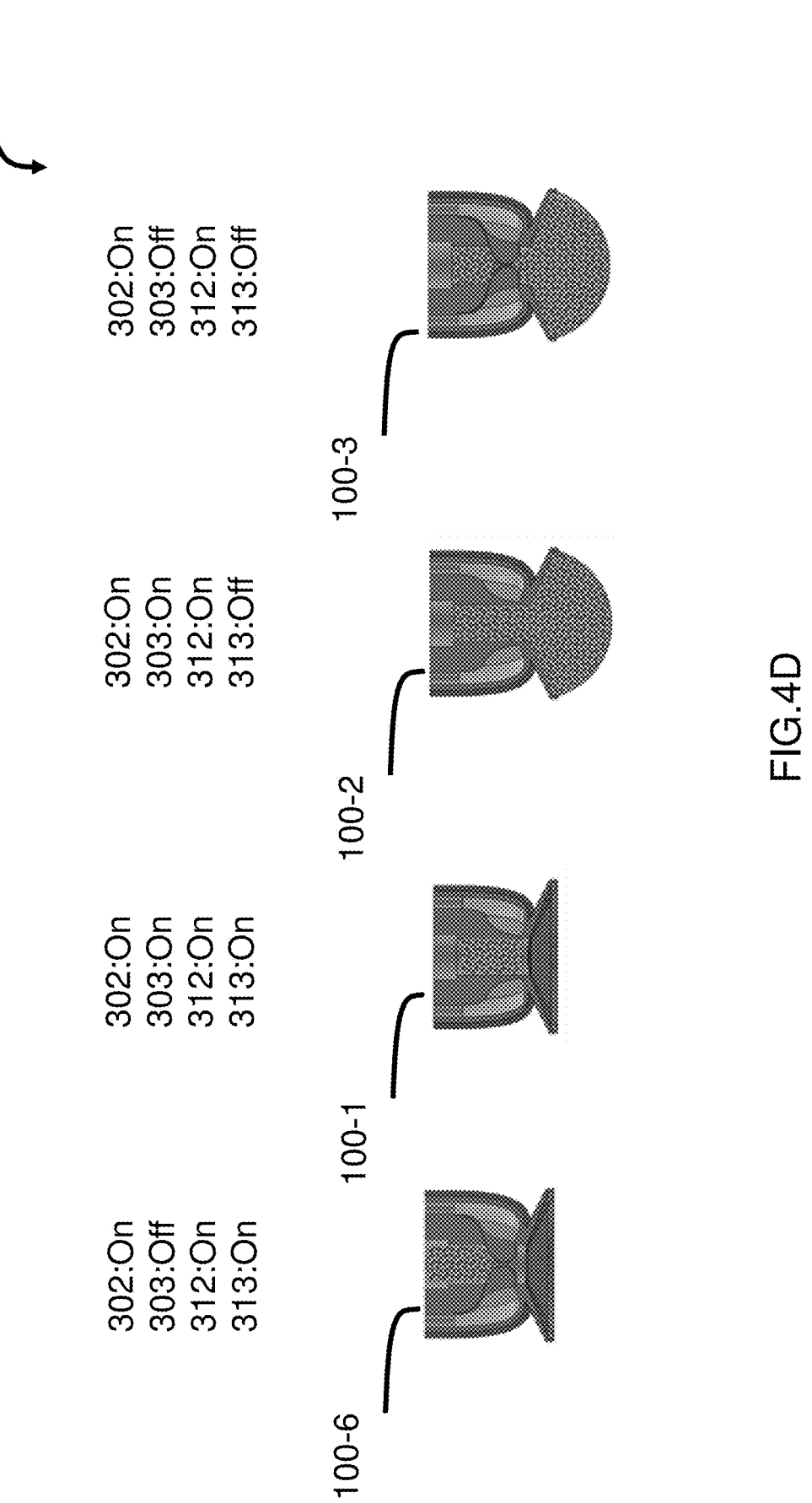

Now referring to FIG. 4D, to achieve the transformation from suction gripper configuration to jamming gripper configuration (transformation 480), a series of actions need to be taken by the pneumatic system. Firstly, the gripper is in a suction status 100-6, with valve 302 in "On" status, valve 303 in "Off" status, valve 312 in "On" status, and valve 313 in "On" status. The process begins with the activation of valve 303, which opens a pathway in the assisted chamber for the jamming granule 108. This leads to the transformation of the gripper 100 from status 100-6 to status 100-1. Subsequently, by changing valve 313 to "Off" status, positive pressure is applied to the main chamber 107. This causes the contact membrane 105 to inflate outward, allowing the jamming granule 108 to drop into the expanded space. The gripper 100 transforms from status 100-1 to status 100-2. In the jamming stage 423, valve 303 is turned to "Off" status. This action inflates the assisted chambers 106 towards the main chamber, preventing the jamming granule 108 from flowing back to the main chamber 107. Consequently, the gripper 100 transforms to status 100-3, making it ready for jamming-based grasping.

Example 5

In this example, the example transformable soft gripper 100 contains:

A 100 mm long main chamber air tube 101 with Thermoplastic Urethane (TPU).

Two 100 mm long assisted chamber air tubes 102 and 112 with TPU.

A main body 103. It is designed in the form of an inverted funnel crafted from DragonSkin 30™. The smaller end of the funnel has a diameter of 15 mm and the larger end of the funnel has a diameter of 20 mm. Within this structure, there is a cylindrical cavity with an 8 mm diameter that aligns with the central axis of the funnel, constituting the main chamber 107. Additionally, symmetrically situated against the main chamber 107 are two cavities, forming the assisted chambers 106.

A suction cup 104. It is connected to the bottom of the main body 103. It is a flexible, concave-shaped cup made from TPU. The overall shape of this cup is akin to a cone with a vertical extension in the widened direction of the cone. The narrower side is connected to the main chamber 107. On the bottom edge surface of the suction cup portion, there are two small grooves 109. These two grooves serve to increase the connection strength between the contact membrane 105.

A contact membrane 105. It is a cylindrical film, measuring 20 mm in diameter and 1.15 mm in thickness, which seals the bottom of the suction cup 104. The membrane is fabricated using Ecoflex-0030™. The contact membrane 105 can have a variety of patterns or designs on its surface, including raised dots, recessed pits, and coatings of different materials.

In this example, the fabrication process of the transformable soft gripper 100 is illustrated through the following steps:

Step 1: Assemble the SLA-3D-Printed top fixer 202, the SLA-3D-Printed close cap 201, the SLA-3D-Printed left outer shell 206, the SLA-3D-Printed left inner shell 205, the SLA-3D-Printed right outer shell 204, the SLA-3D-Printed right inner shell 203, and the SLA-3D-Printed base mold 207 to make a complete mold 208. Then pour 15 g of DragonSkin 30™ silicone gel via the top opening of the top fixer 202 and let the mold 208 sit for 20 minutes in the vacuum environment. After 20 minutes, remove mold 208 from the vacuum environment. Let mold 208 sit for 16 hours to allow the DragonSkin 30™ silicone rubber to cure the main body 209. Then, remove mold 208.

Step 2: Fill mold 210 with 5 g of DragonSkin 30™ silicone rubber. Place the filled mold 210 in a vacuum environment and let it sit for 20 minutes. After this time, remove the mold 210 from the vacuum environment and attach the upper side of the main body 209 to the bottom of mold 210. Let them sit for 4 hours to allow the DragonSkin 30™ silicone rubber to cure a cap for the main body 209 and become the new main body 211. Then, remove the mold 210 from the main body 211.

Step 3: Fill mold 221 with 2 g of Ecoflex-0030™ silicone rubber and put it in a vacuum environment for 5 minutes. After this period, remove the mold 221 from the vacuum chamber and let it sit for 4 hours, allowing the silicone rubber to cure and form the contact membrane 105. Then, adhere the contact membrane 105 to seal the bottom opening of the main body 209 of the transformable soft gripper 100 using silicone rubber adhesive Sil-Poxy™. Additionally, attach the main chamber air tube 101 and two assisted chamber air tubes 102 and 112 to the top opening of the main body 209 using silicone rubber adhesive Sil-Poxy™. Once the adhesive has cured, fill the main chamber air tube 101 with 10 g of dry coffee grounds to complete the fabrication of the transformable soft gripper 100.

In various industrial production or underwater object retrieval scenarios, actuators often face numerous challenges. These challenges include the necessity to operate both on the water surface and underwater, or the requirement to remove larger debris before picking up smaller objects. In this example, the valves 302, 303, 312, 313 are initially all in "On" status. The gripper 100 is in its resting status 100-1 and is placed on the top of a 50 mm×50 mm acrylic box 551. Next, during the suction stage 442, valve 312 is switched to "Off" status, allowing a −25 kPa pressure to be transmitted to the main chamber 107. This action causes the contact membrane 105 to deflate inward, pushing the jamming granule 108 to the main chamber 107. The gripper 100 is transformed from status 100-1 to status 100-5. Subsequently, valves 303 and 313 are turned to "Off" status, while valve 312 is turned to "On" status. This causes the assisted chamber 106 to inflate toward the main chamber, preventing the jamming granule 108 from dropping back to the suction cup 104. The contact membrane is inflated outward with a 2 kPa pressure, making the gripper 100 transform to status 100-6. During the next phase, in suction stage 444, the gripper 100-6 descends toward the acrylic box 551 until the acrylic box 551 is fully contacted by the membrane 105. Valve 313 is then turned to "On" status, allowing a −25 kPa pressure to be transmitted to the main chamber 107. It creates a vacuum space between the contact membrane 105 and the acrylic box 551. This transformation turns the gripper 100 to status 100-7. Finally, valve 313 is turned to "Off" status, allowing the target 431 to adhere to the gripper 100-7. The gripper 100 removed the top of acrylic box 551. After this action, the gripper 100 transforms from the suction gripper configuration to the jamming gripper configuration (transformation 480). Valve 303 is turned to "Off" status, causing the assisted chamber 106 to inflate towards the main chamber, preventing the jamming granule 108 from flowing back to the main chamber 107. This transformation turns the gripper 100 into status 100-3. The gripper 100 then moves down towards a green bean 552 with a 4 mm diameter inside box 551. The gripper continues its operation until the green bean 552 is completely surrounded by the jamming granule 108. Valve 313 is subsequently turned to "On" status, applying a −25 kPa pressure to the main chamber 107. This compresses the jamming granule 108 towards the target 431 and transforms the gripper 100 to status 100-4. Finally, valve 313 is turned to "Off" status, securing the target 431 to the gripper in status 100-4. The gripper 100 attaches to the green bean 552 and removes it from the box 551.

Embodiment 2

Example 6

Figure 5A:
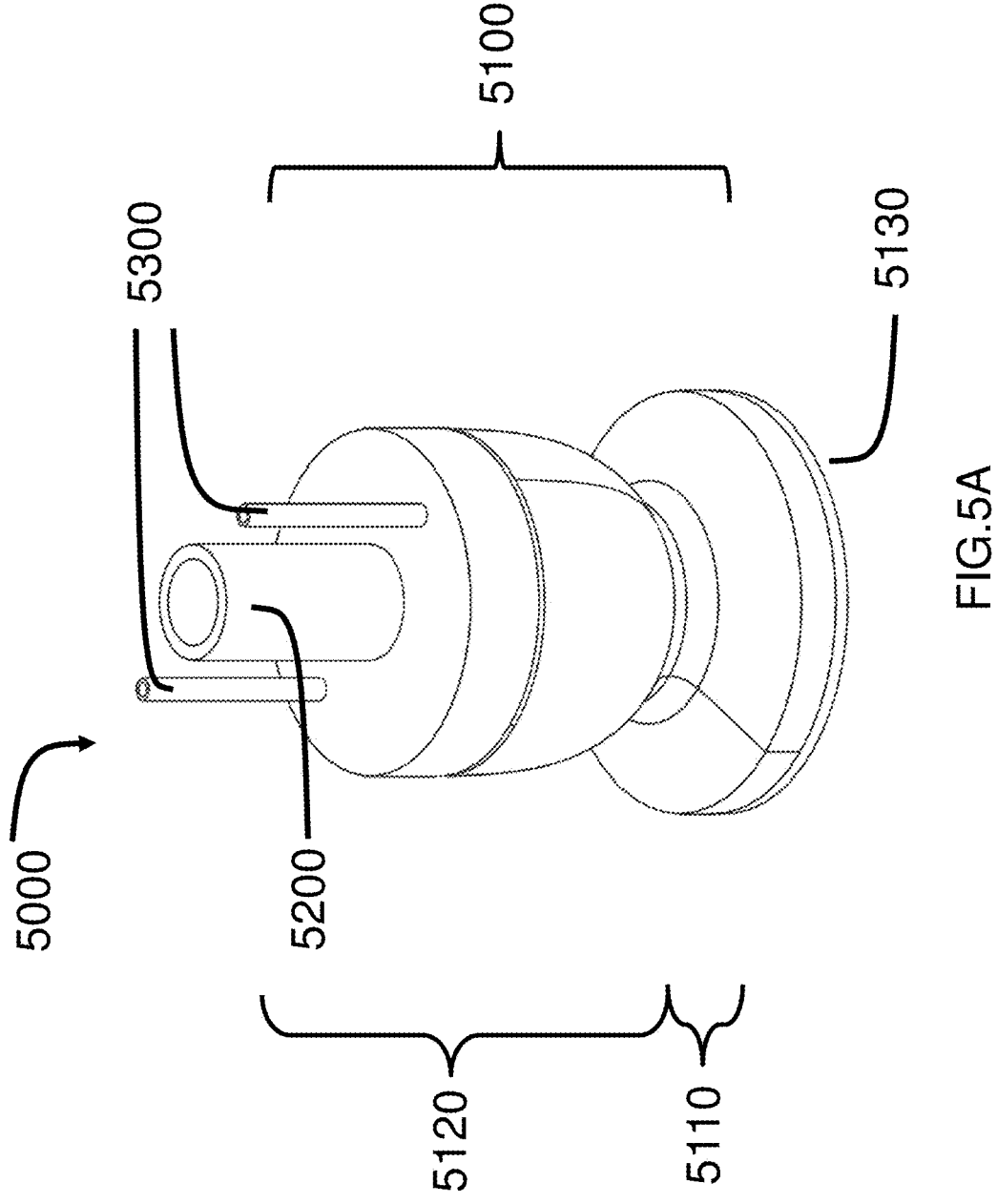
FIG. 5A is a perspective view of an example soft gripper with a transformation mechanism, according to another example embodiment.
Figure 5B:
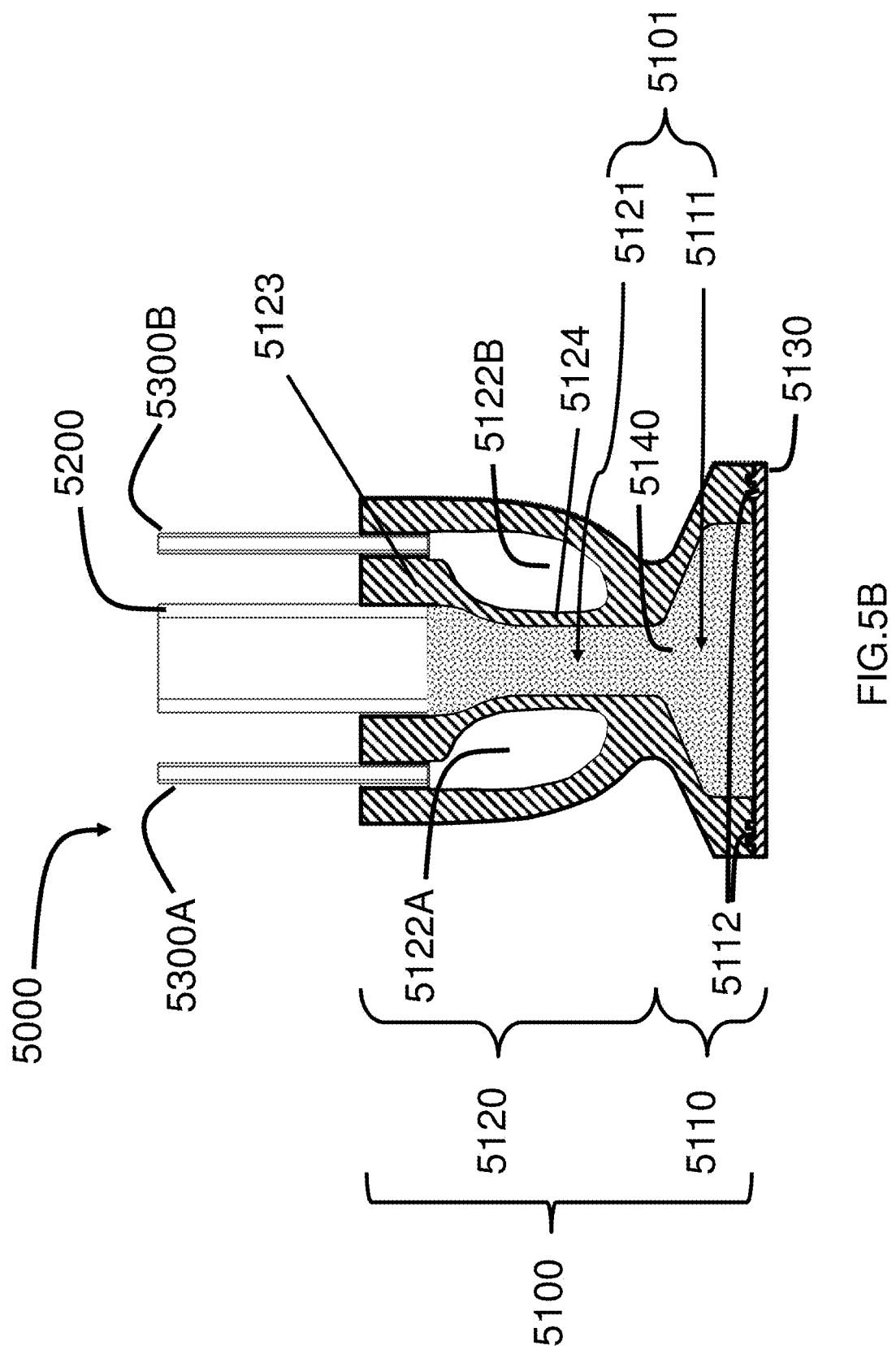
FIG. 5B is a cross sectional view of an example soft gripper with a transformation mechanism, according to the same embodiment of FIG. 5A.

Now referring to FIGS. 5A-5B, showing an example transformable soft gripper 5000 which generally contains a main body 5100 and a contact membrane 5130. For ease of description, the direction closer to the contact membrane 5130 of the soft gripper 5000 is called "proximal", and the direction away from the contact membrane 5130 of the soft gripper 5000 is called "distal". The side closer to the contact membrane 5130 is called "proximal side", and the side away from the contact membrane 5130 is called "distal side".

The main body 5100 generally contains a suction cup portion 5110 with an open end at the proximal side, and a neck portion 5120 that is connected with or extended from the suction cup portion 5110.

Now referring to FIG. 5B, in this example, the neck portion 5120 is extended from the suction cup portion 5110 to form an integral piece of main body 5100. The neck portion 5120 defines a neck chamber 5121 therein and the suction cup portion 5110 defines a suction cup chamber 5111 therein. The neck chamber 5121 and the suction cup chamber 5111 together form a main chamber 5101 defined by the main body 5100 and the contact membrane 5130. The neck chamber 5121 further contains or connects with a cylindrical, hollow main chamber air tube 5200 (also shown in FIG. 5A) that is sized and shaped to connect with the main chamber 5101 with a first pneumatic source (not shown here, will be described in more details later) and that is configured to be in gas communication with the main chamber 5101 and the first pneumatic source. In this example, the main chamber air tube 5200 is made of flexible material. In this example, the neck portion 5120 generally is in an inverted, truncated doom shape, having a reduced diameter proximal side connected with or extended from the distal side of the suction cup portion 5110 and an opposing, larger diameter distal side. The neck chamber 5121 generally is a cylindrical shaped cavity, aligns with the central axial axis of the neck portion 5120 of the main body 5100. The neck chamber 5121 further comprises a reduced diameter proximal chamber configured to be in gas communication with the cup chamber, and a larger diameter distal chamber configured to be connect with the main chamber air tube 5200. The neck portion 5120 further defines at least one assisted chambers 5122 therein, which are disposed around the central axial axis of the neck portion 5120 and configured to be in gas communication with a second pneumatic source (not shown, will be described in more details later), respectively. In this example, the neck portion 5120 contains two separate assisted chambers 5122A, 5122B (or generally named as 5122) disposed around the central neck chamber 5121. Each of the assisted chamber 5122 generally contains a lower, larger cavity and an upper, reduced cylindrical shaped cavity sized and shaped to fit with an assisted chamber air tube 5300 (also shown in FIG. 5A). In this example, the two assisted chambers 5122A, 5122B are two curved rectangular shaped cavities with C-shaped transverse cross sections, symmetrically aligned against the neck chamber 5121 of the main chamber 5101. Each assisted chamber 5122 further contains or connects with the cylindrical, hollow assisted chamber air tube 5300A, B that is sized and shaped to connect with the neck chamber 5121 with a second pneumatic source and that is configured to be in gas communication with the neck chamber 5121 and the second pneumatic source. In this example, the assisted chamber air tubes 5300 are made of flexible material. Each of the assisted chambers 5122 has a narrow upper opening and a larger lower space. Hence, the upper wall 5123 between the neck chamber 5121 of the main chamber 5101 and the assisted chambers 5122 are thicker than the lower wall 5124 between the neck chamber 5121 of the main chamber 5101 and the assisted chambers 5122.

Still referring to FIGS. 5A and 5B, the suction cup portion 5110 is connected to or extended from the bottom of the main body 5100. In this example, the suction cup portion 5110 is extended from the main body 5100 and it is a concave-shaped cup made of flexible material same as the main body 5100. The overall shape is akin to a cone with a vertical extension in the widened direction of the cone. The narrower side is connected to or extended from the proximal side of the neck chamber 5121. The peripheral the bottom side of the suction cup portion 5110 further contains two pairs of small grooves 5112, each pair are disposed on the opposing end. These grooves 5112 serve to increase the connection strength between the contact membrane 5130 in FIG. 5B.

The contact membrane 5130 is a flexible thin film or sheet that substantially covers and seals the bottom open end of the suction cup 104 to form the main chamber 5101. By way of example, the contact membrane 5130 further contains a variety of patterns or designs on its surface, including protrusions and/or indentations such as raised dots, rims, or recessed pits, and coatings of different materials, such as to increase the frictional contact of a target object. By way of example, the contact membrane 5130 is made of one or more flexible materials such as silicone rubber such as Ecoflex 00-30 or Ecoflex 00-10 (Smooth-on Inc.). In some embodiments, the contact membrane 5130 is configured to be more flexible than that of the main body 5100. By way of example, the membrane casting material is dopamine based adhesive nano-coatings or hyaluronic acid hydrogel adhesive, or combination thereof.

The main chamber 5101 is configured to receive one or more jamming materials. In this example, the main chamber 5101 is filled with jamming particles or jamming granules 5140. By way of example, the jamming granules 5140 are made of coffee ground with an average size of 0.1 mm. By way of example, the main body 5100 is made of one or more flexible materials such as rubber, silicone rubber (such as Dragon Skin 0030 or Dragon Skin 0010 (Smooth-On Inc.)) or Room-Temperature-Vulcanizing silicone (RTV Silicone) rubber or combination thereof.

Figure 5C:
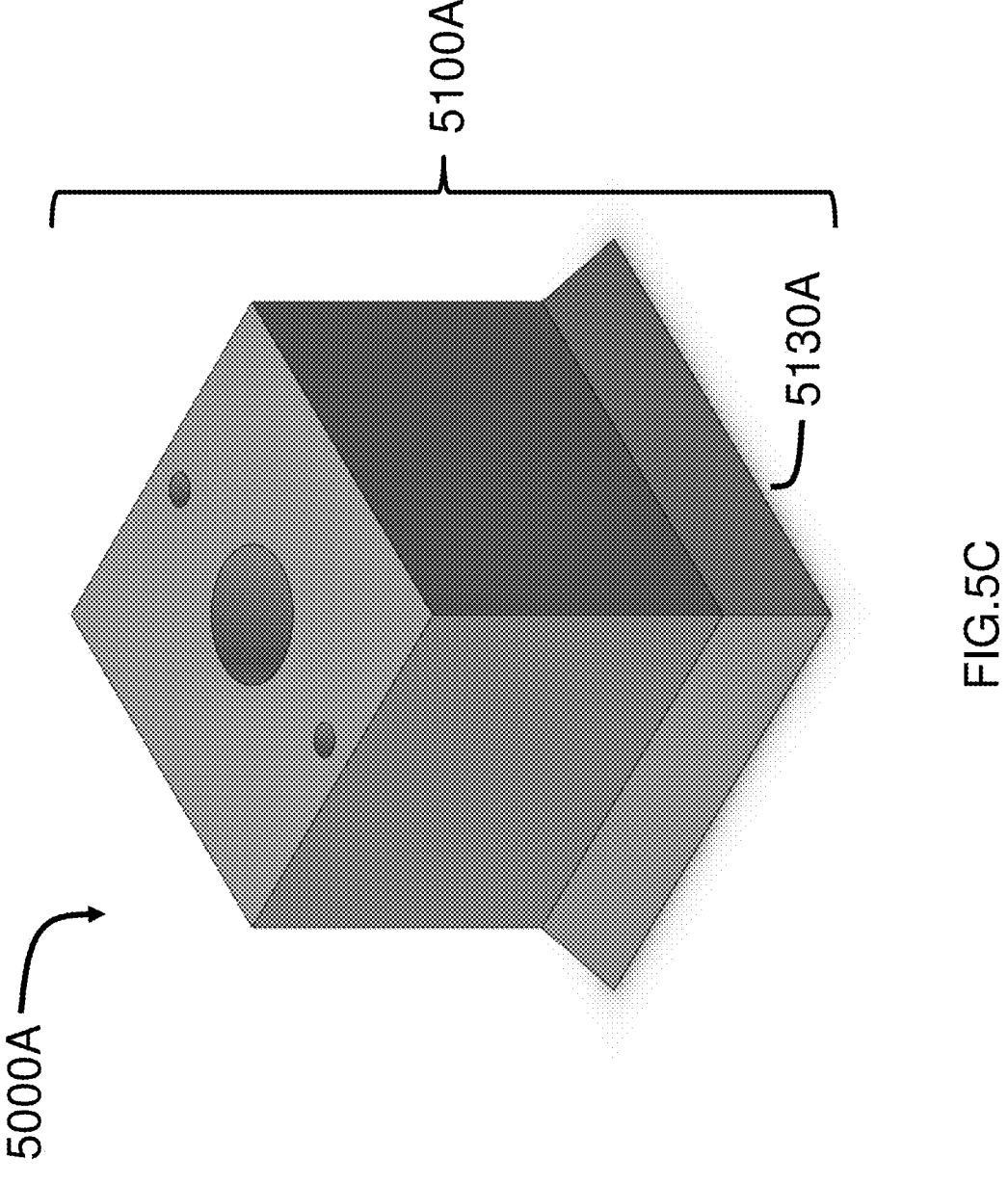
FIG. 5C is a perspective view of an example soft gripper with a transformation mechanism in square shape, according to yet another example embodiment.
Figures 5D, 5E:
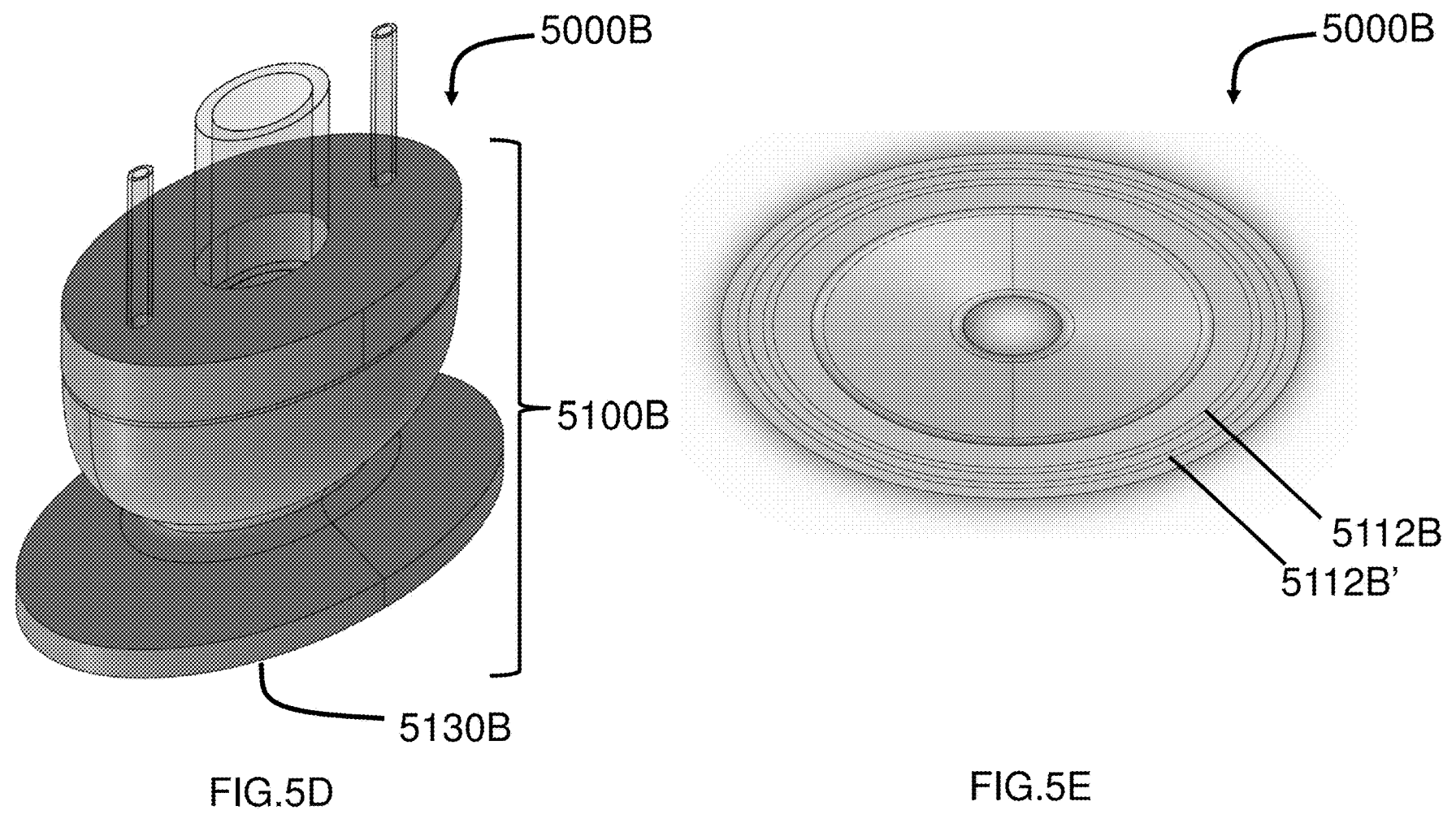

The main body 5100, the contact membrane 5130, the main chamber 5101 and assisted chambers 5122 can have various sizes, shapes and configurations, respectively. The example transformable soft gripper 5000 in FIGS. 5A-5B has a generally circular transverse cross-section. Now referring to FIG. 5C, showing another example transformable soft gripper structure 5000A with main body 5100A and contact membrane 5130A having a generally rectangular or square cross-section with two assisted chamber. Now referring to FIGS. 5D and 5E, showing another example transformable soft gripper structure 5000B with main body 5100B and contact membrane 5130B having a generally ellipse cross-section, and the bottom surface of the main body 5100B contains two ring-shaped grooves 5112B and 5112B'.

Figures 5F, 5G:
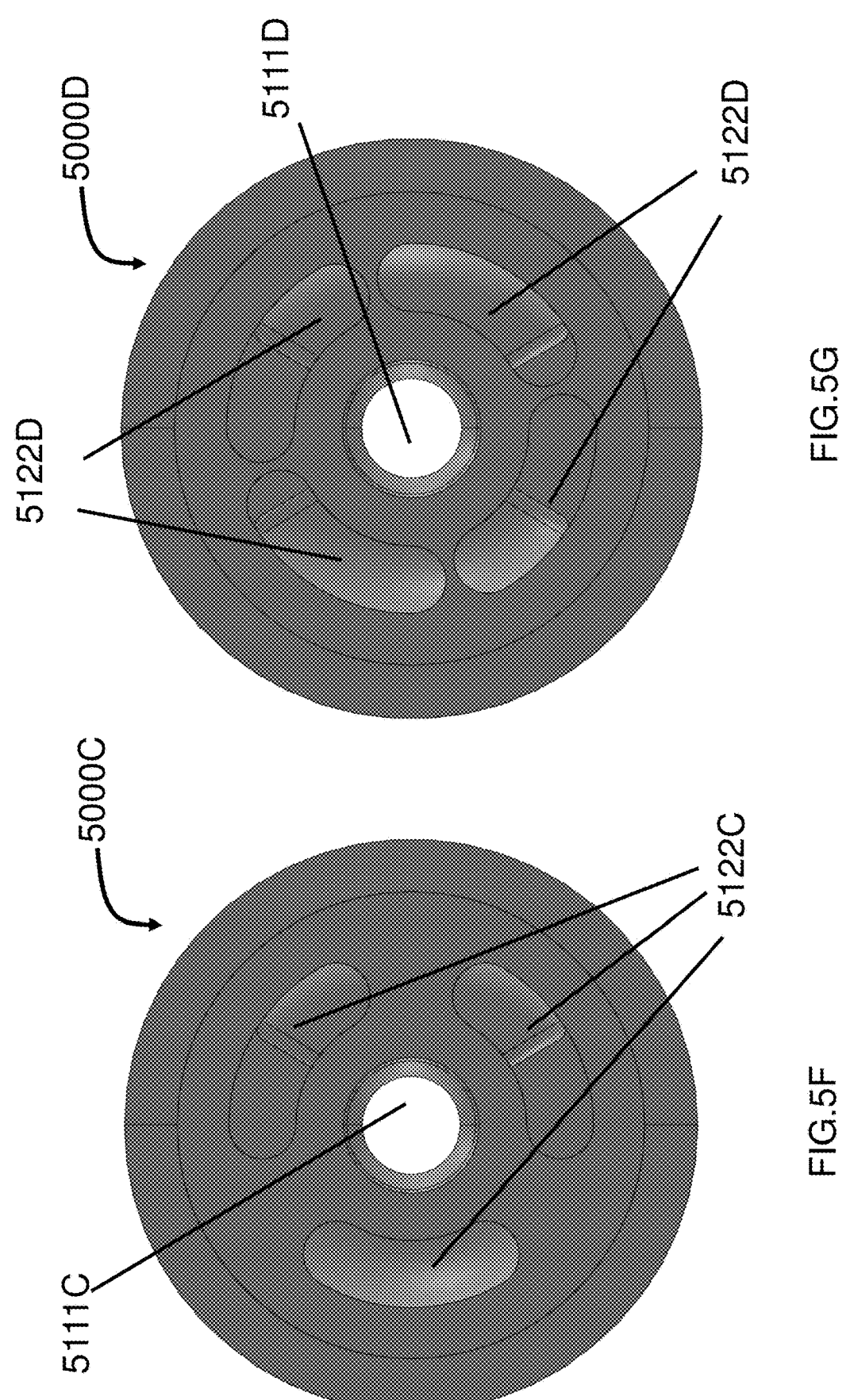
FIG. 5F is a schematic cross-sectional view of an example soft gripper with three assisted chambers, according to yet another example embodiment.
FIG. 5G is a schematic cross-sectional view of an example soft with four assisted chambers, according to yet another example embodiment.

The number of assisted chambers 5122 provided in the soft grippers 5000 can vary. Now referring to FIGS. 5F-5G, showing other the example transformable soft grippers 5000C and 5000D which include more than two assisted chambers 5122C and 5122D. The example transformable soft gripper 5000C includes three assisted chambers 5122C and a main chamber 5111C, and example transformable soft gripper 5000D includes four assisted chambers 5122D and a main chamber 5111D, respectively, disposed substantially around the central axis of the main body.

Example 7

Figure 6A:
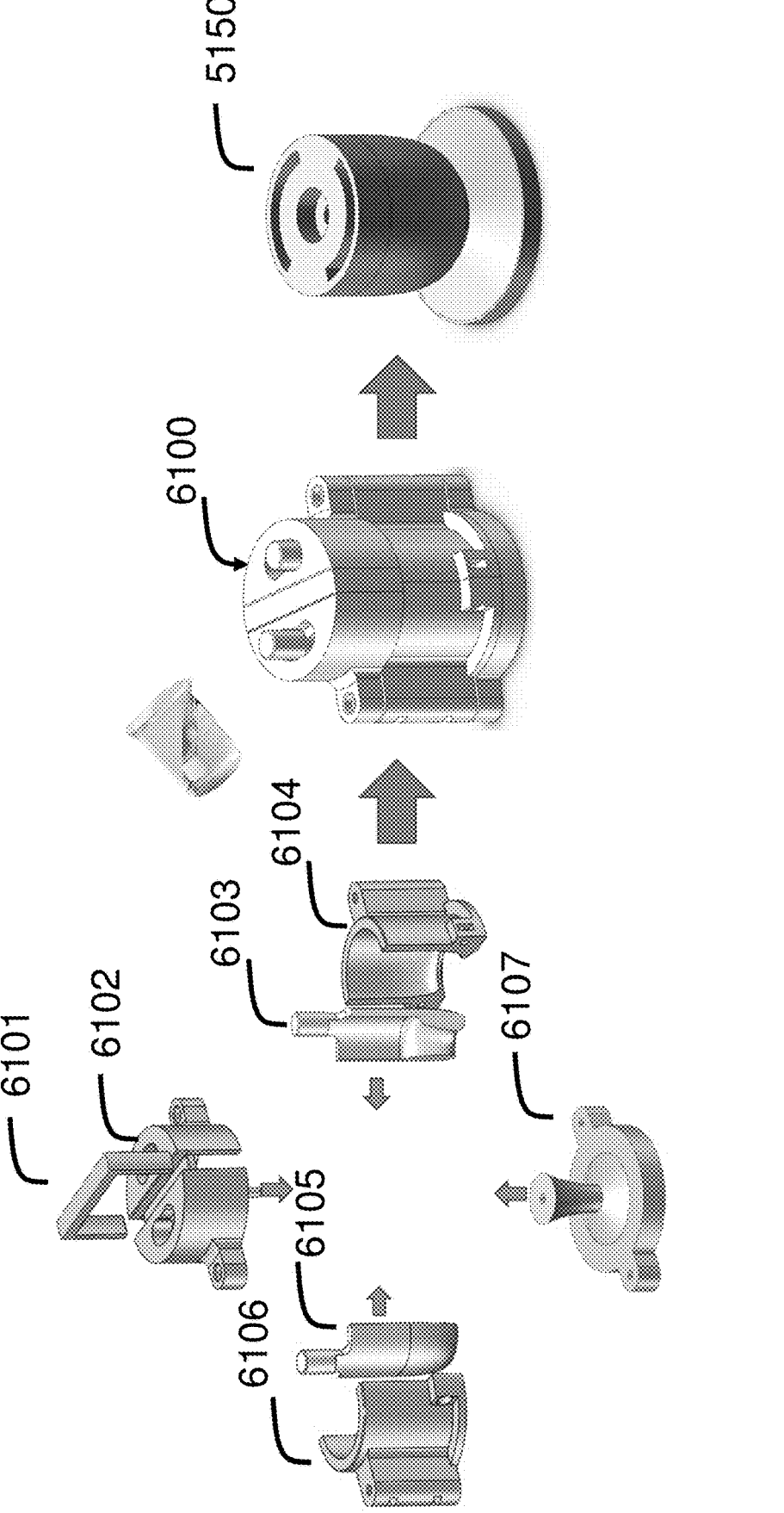
FIGS. 6A-6C are schematic diagrams of an example fabrication method of the soft gripper, according to another example embodiment.
Figure 6B:
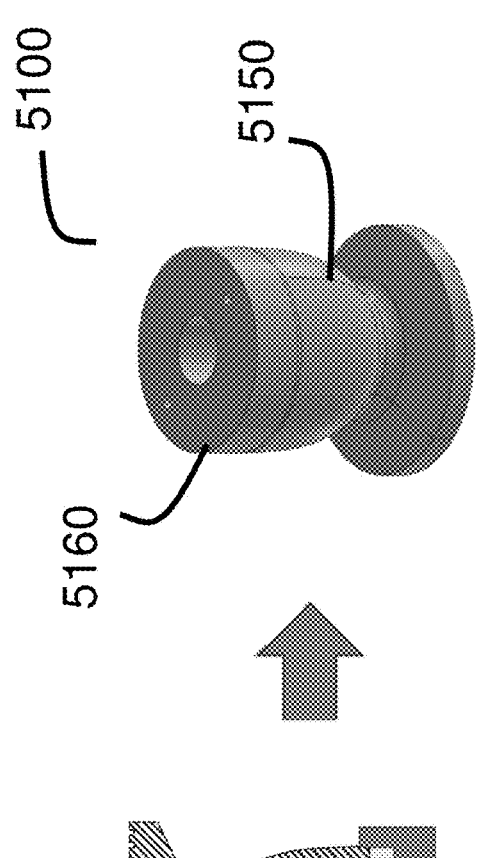
Figure 6B:
Figure 6B:
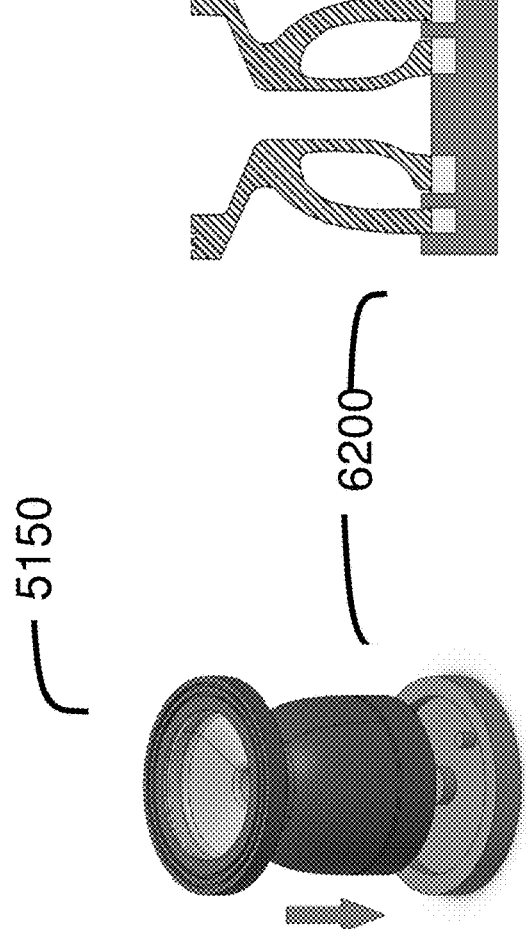
Figure 6C:
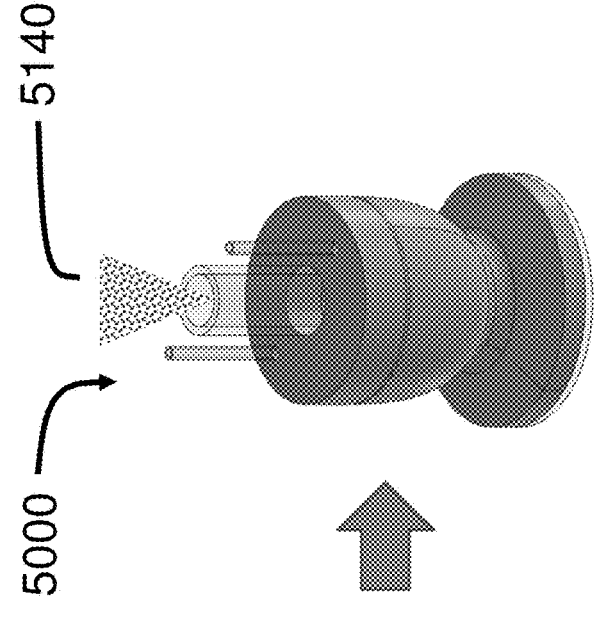
Figure 6C:
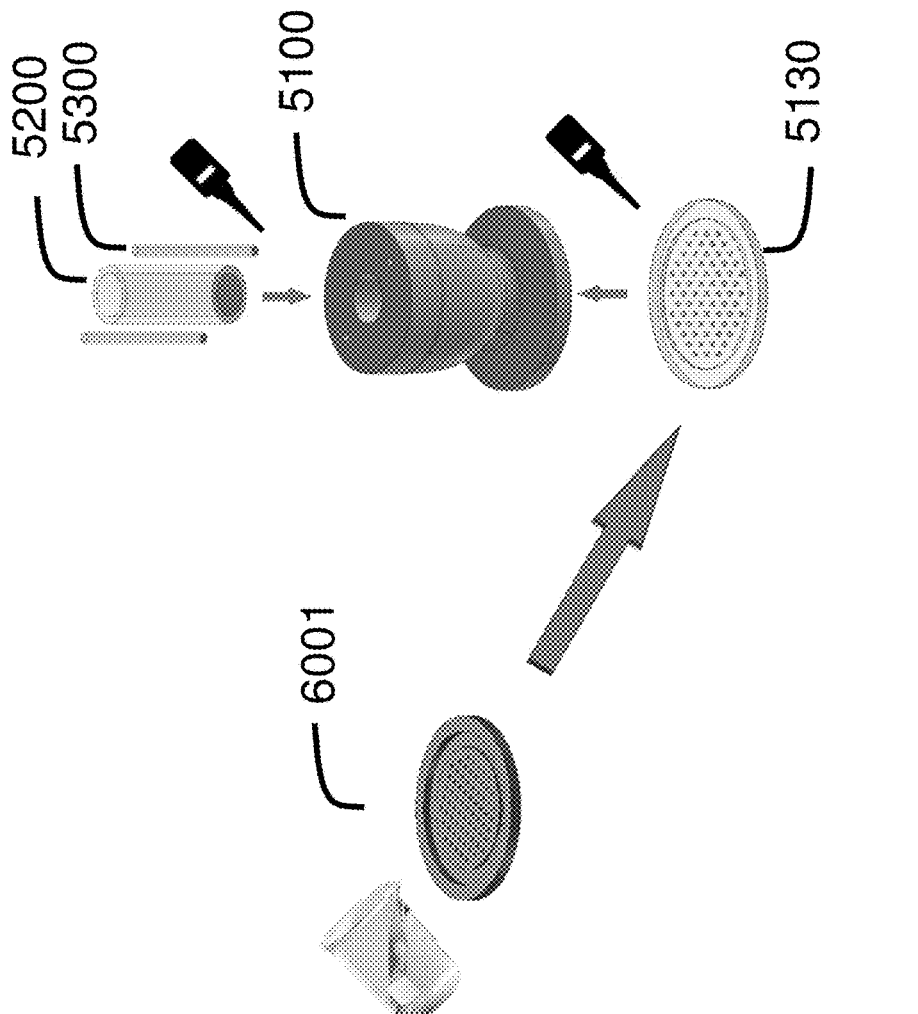

Now referring to FIGS. 6A-6C, to fabricate a transformable soft gripper (taking the example transformable soft gripper 5000 as described in Example 5 as an example), an example fabrication method is provided with the following steps:

Step 1: Providing a main body: providing a main body mold sized and shaped to form the main body having the suction cup portion and a lower neck portion containing assisted chambers and main chamber. In this example, the main body mold generally includes a lower main body mold 6100 to form a lower main body 5150 (or lower portion) and an upper main body mold 6200 to form the upper main body 5160 (or upper portion). The main body 5100 is formed from the lower main body 5150 and the upper main body 5160.

Step 1a: Providing the lower main body 5150: Referring to FIG. 6A, the lower main body mold 6100 generally contains top fixer 6102, close cap 6101, left outer shell 6106, left inner shell 6105, right inner shell 6104, right inner shell 6103, and base mold 6107. By way of example, these main body mold components are made by 3D printing. Assembling the top fixer 6102, the close cap 6101, the left outer shell 6106, the left inner shell 6105, the right inner shell 6104, the right inner shell 6103, and the base mold 6107 to form a completed lower main body mold 6100. Then, pouring a first flexible material (e.g., silicone gel) via the top opening of the top fixer 6102 and letting the lower main body mold 6100 sit in the vacuum environment for degassing. After degassing, removing the lower main body mold 6100 from vacuum environment. Letting the lower main body mold 6100 sit for curing to allow the first flexible material (e.g., silicone rubber) to cure as the lower main body 5150. Then, removing the lower main body mold 6100 to obtain the lower main body 5150.

Step 1b: Providing the upper main body 5160: Referring to FIG. 6B, providing an upper main body mold 6200. Filling the upper main body mold 6200 with the first flexible material (e.g., silicone rubber). In other examples, the upper main body mold 6200 is filled with other flexible materials that are different from the first flexible material. In one implementation, placing the filled, upper main body mold 6200 in a vacuum environment and let it sit for degassing. After degassing, removing the upper main body mold 6200 from the vacuum environment and fit the upper (distal) side of the lower main body 5150 formed from step 1a to the bottom of upper main body mold 6200. Letting them sit for curing to allow the first flexible material (e.g., silicone rubber) to cure a cap or the upper main body 5160 for the lower main body 5150 and form the main body 5100. Then, removing upper main body mold 6200 from the main body 5100 to obtain the main body 5100.

Step 2: Providing a contact membrane 5130: Referring to FIG. 6C, providing a membrane mold 6001 sized and shaped to form the contact membrane 5130 and curing a second flexible material that is more flexible than the first flexible material into the membrane mold 6001. In one implementation, filling the membrane mold 6001 with the second flexible material (e.g., soft silicone rubber), placing it in a vacuum environment, and letting it sit for degassing. After degassing, removing the membrane mold 6001 from the vacuum chamber and letting it sit curing to allow the second flexible material to cure as the contact membrane 5130.

Step 3: Attaching the contact membrane 5130 to the main body 5100: Still referring to FIG. 6C, attaching or adhering the contact membrane 5130 to seal the bottom end opening of the main body 5100 such as with silicone rubber adhesive.

Additionally or optionally, attaching adhering the main chamber air tube 5200 and one or more assisted chamber air tubes 5300 onto the top opening of the main body 5100 to connect with the main chamber and assisted chambers, respectively, such as with silicone rubber adhesive. After filling suitable amounts of jamming granules 5140 to the main chamber air tube 5200, the example transformable soft gripper 5000 is fabricated.

Example 8

Figure 7:
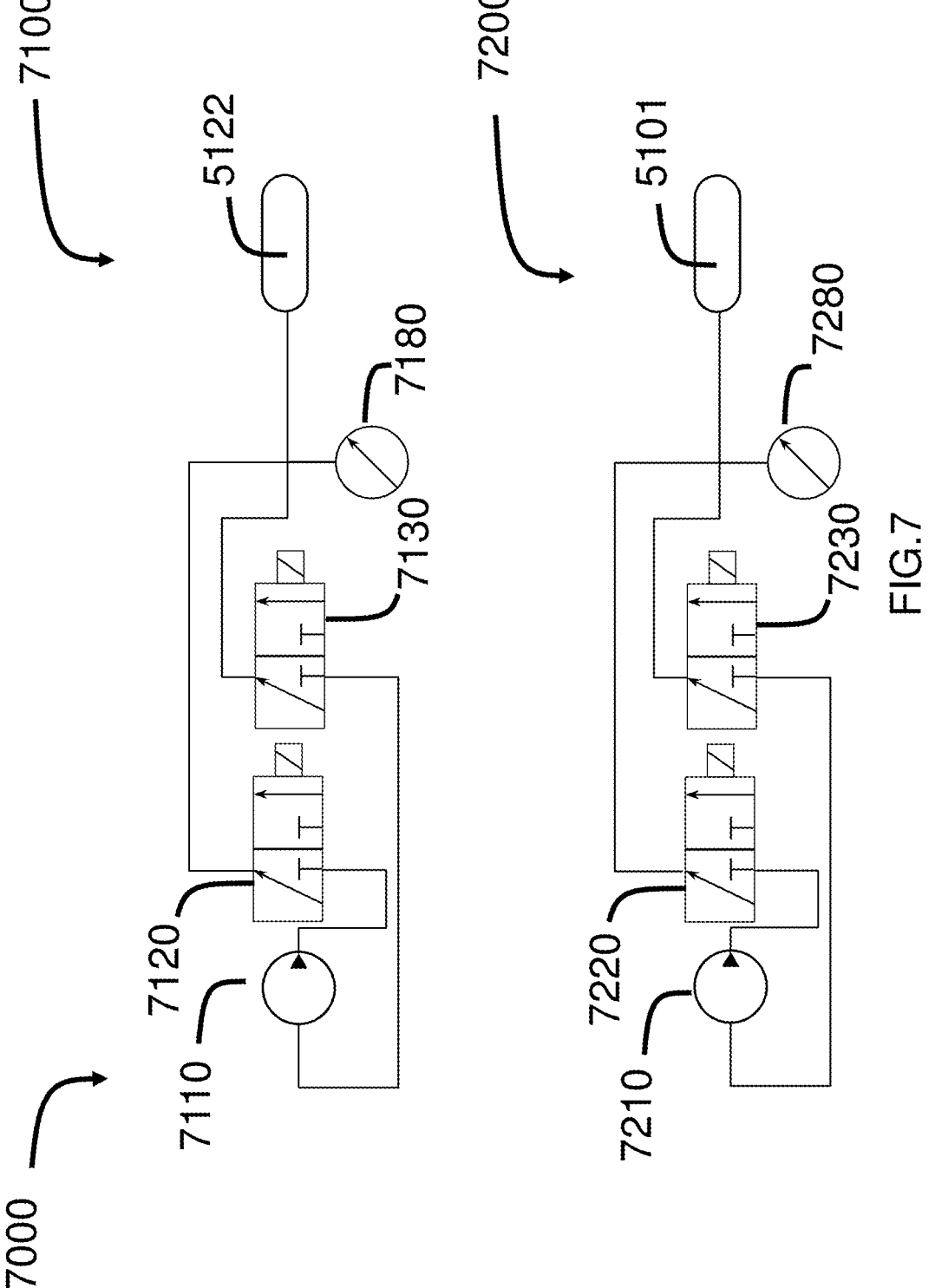
FIG. 7 is a schematic diagram of an example pneumatic control system for controlling the soft gripper, according to another example embodiment.

Now referring to FIG. 7, the example pneumatic control system 7000 for controlling an example transformable soft gripper as described in any one of the examples herein (taking the example transformable soft gripper 5000 in Example 5 as an example). The example pneumatic control system 7000 generally contains two control systems, the assisted chamber control system 7100 and the main chamber control system 7200.

The assisted chamber control system 7100 is directly or indirectly connected with and/or is in air communication with the assisted chambers 5122 and is configured to provide and control a second pressure within the assisted chambers 5122. In one implementation, the assisted chamber control system 7100 is connected with and/or is in air communication with the assisted chambers 5122 by assisted chamber air tubes 5300. The assisted chamber control system 7100 generally contains a second pneumatic source 7110, a first valve 7120, a second valve 7130 and a pressure gauge 7180. In this example, the second pneumatic source 7110 is or contains a compressor, and both the first valve 7120 and the second valve 7130 are 2/3-way electric valves, each of which is configured to be switchable between On status and Off status. The compressor contains an outlet which is connected to the first valve 7120, and an inlet which is connected to the second valve 7130. The first valve 7120 is configured to connect between outlet of the second pneumatic source 7110 and the at least one assisted chambers 5122, and the second valve 7130 is configured to connect between inlet of the second pneumatic source 7110 and the at least one assisted chambers 5122. The pressure gauge 7180 was connected between the outlets of the first valve 7120 and the second valve 7130 and the at least one assisted chambers 5122. The assisted chamber control system 7100 comprises a first configuration, a second configuration, a third configuration and a fourth configuration. When the first valve 7120 is in "On" status and the second valve 7130 is in "Off" status (i.e., the first configuration), the second pneumatic source (compressor) 7110 is configured to pump air from the surroundings and transmit a positive second pressure to the assisted chambers 5122. This positive pressure causes the assisted chambers 5122 to inflate or expand towards the neck chamber 5121 of the main chamber 5101, thereby closing the neck chamber 5121 as a closed state to effectively prevent jamming granules 5140 from passing through the main chamber 5101. When the first valve 7120 is in "Off" status and the second valve 7130 is in "On" status (i.e., the second configuration), the second pneumatic source (compressor) 7110 is configured to pump air to the surroundings, creating a negative, second pressure within the assisted chamber 5122. This negative pressure leads to the assisted chambers 5122 deflating or contracting, opening the neck chamber 5121 as an open state and allowing jamming materials 5140 to pass through the neck chamber 5121 of the main chamber 5101. When both the first valve 7120 and the second valve 7130 are in the "Off" status (i.e., the third configuration), the second pressure within the assisted chambers 5122 is locked or maintained. When both valves are set to "On" (i.e., the fourth configuration), the second pressure within the assisted chambers 5122 is substantially equal to the atmospheric pressure.

The main chamber control system 7200 is directly or indirectly connected with and/or is in air communication with the main chamber 5101 and is configured to provide and control a first pressure within the main chamber 5101. In one implementation, the main chamber control system 7200 is connected with and/or is in air communication with the main chamber 5101 by the main chamber air tube 5200. The main chamber control system 7200 generally contains a first pneumatic source 7210, a third valve 7220, a fourth valve 7230 and a pressure gauge 7280. In this example, the first pneumatic source 7210 is or contains a compressor, and both the third valve 7220 and the fourth value 312 are 2/3-way electric valves, each of which is configured to be switchable between On status and Off status. The compressor contains an outlet which is connected to the third valve 7220, and an inlet which is connected to the fourth valve 7230. The third valve 7220 is configured to connect between outlet of the first pneumatic source 7210 and the main chamber 5101, and the fourth valve 7230 is configured to connect between inlet of the first pneumatic source 7210 and the main chamber 5101. The pressure gauge 7280 was connected between the outlets of the third valve 7220 and the fourth valve 7230 and the main chamber 5101. The main chamber control system 7200 comprises a fifth configuration, a sixth configuration, a seventh configuration, and an eighth configuration. When the third valve 7220 is in "On" status and the fourth valve 7230 is in "Off" status (i.e., the fifth configuration), the first pneumatic source (compressor) 7210 is configured to pump air from the surroundings and transmit a positive first pressure to the main chamber 5101, causing the contact membrane 5130 to inflate outward as in inflated state. When the third valve 7220 is in "Off" status and the fourth valve 7230 is in "On" status (i.e., the sixth configuration), the first pneumatic source (compressor) 7210 is configured to pump air to the surroundings and transmit negative, first pressure to the main chamber 5101, causing the contact membrane 5130 to deflate inward as a deflated state. When both the third valve 7220 and the fourth valve 7230 are in the "Off" status (i.e., the seventh configuration), the first pressure in the main chamber 5101 is locked or maintained. When both valves are in the "On" status (i.e., the eighth configuration), the first pressure within the main chamber 5101 is substantially equal to the atmospheric pressure. Table 1 summarized the eight configurations of the pneumatic system 7000. By controlling the contact membrane 5130 and the neck chamber 5121 of the main chamber 5101 in different deforming states by controlling the pneumatic system 7000 under different configurations, the transformable soft gripper 5000 is configured to be switchable at least between a suction gripper configuration and a jamming gripper configuration. More details will be described in the later examples.

18

TABLE 1

Eight configurations of the pneumatic system 7000

| | Status of Valves | | | | Status of Chambers | |
| | | | | | Assisted chambers | |
| | first valve 7120 | second valve 7130 | third valve 7220 | fourth valve 7230 | 5122/neck chamber 5121 | main chamber 5101 |
|---|---|---|---|---|---|---|
| First Configuration | On | Off | N/A | N/A | Positive, second pressure applies to the assisted chambers to expand; Neck chamber is in closed state | N/A |
| Second Configuration | Off | On | N/A | N/A | Negative, second pressure applies to the assisted chambers to deflate; Neck chamber is in open state | N/A |
| Third Configuration | Off | Off | N/A | N/A | second pressure within the assisted chambers is maintained | N/A |
| Fourth Configuration | On | On | N/A | N/A | second pressure within assisted chambers substantially equal to atmospheric pressure | N/A |
| Fifth Configuration | N/A | N/A | On | Off | N/A | positive, first pressure applies to the main chamber, contact membrane inflates outward, as an inflated state |
| Sixth Configuration | N/A | N/A | Off | On | N/A | negative, first pressure applies to the main chamber, contact membrane deflates inward, as a deflated state |
| Seventh Configuration | N/A | N/A | Off | Off | N/A | first pressure within the main chamber is maintained |
| Eighth Configuration | N/A | N/A | On | On | N/A | first pressure within the main chamber is substantially equal to atmospheric pressure |

Example 9

Now referring to FIGS. 8A-8D, the transformable soft gripper (such as example transformable soft gripper 5000 as described in Example 5) can perform at least four functions: (1) jamming attachment configuration 8100, for grasping objects that may be smaller than the gripper; (2) suction attachment configuration 8200, for grasping objects that may be larger than the gripper; (3) transformation from jamming gripper configuration 8400 to suction gripper configuration 8300 (first transformation configuration 8301); and (4) transformation from suction gripper configuration 8300 to jamming gripper configuration 8400 (second transformation configuration 8401). In one implementation, such functions are under the control of an example pneumatic system (such as using the example system 7000 as described in EXAMPLE 8 as an example).

Figure 8A:
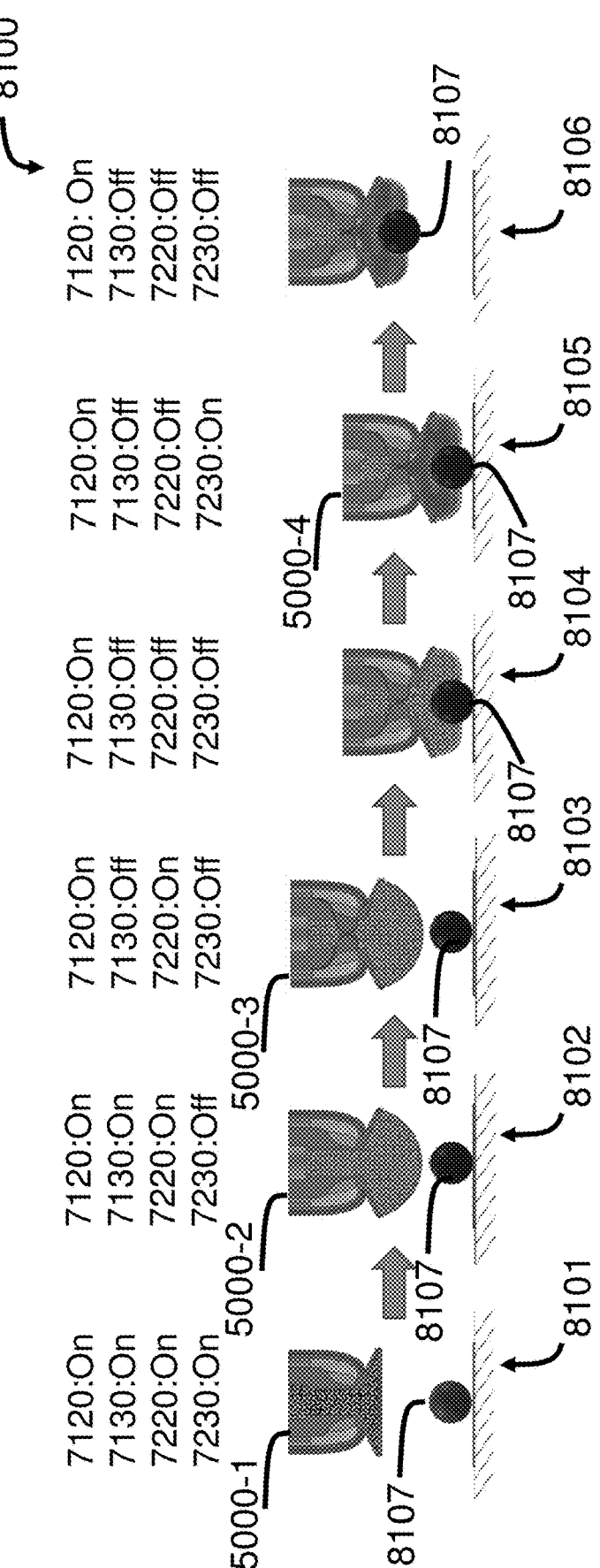
FIGS. 8A-8D are schematic diagrams of an example controlling scheme of the soft gripper in jamming attachment configuration, suction attachment configuration, transformation from jamming gripper configuration and transformation from suction gripper configuration to jamming gripper configuration, respectively, using an example pneumatic control system, according to another example embodiment.

Now referring to FIG. 8A, to achieve jamming attachment configuration 8100, a series of actions and steps are executed by the example pneumatic system. Firstly, during jamming stage 8101, the first, second, third, and fourth valves 7120, 7130, 7220, 7230 are all in "On" status (i.e., the assisted chamber control system and the main chamber control system of the pneumatic system are configured as fourth configuration and eighth configuration, respectively), and the example soft gripper 5000 is in its resting status 5000-1, the contact membrane 5130 is in the flat state. The soft gripper 5000 is configured to position atop a target object 8107. In this example, the target object 8107 is a spherical object with a size smaller than the soft gripper 5000. Next, in the jamming stage 8102, by changing fourth valve 7230 to "Off" status (i.e., the main chamber control system is configured as fifth configuration), positive first pressure is transmitted to the main chamber 5101, causing the contact membrane 5130 to inflate outward as the inflated state. As a result, the jamming granule 5140 drops into the expanded space within the suction cup, transforming the soft gripper 5000 from status 5000-1 to status 5000-2. Then, in jamming stage 8103, the second valve 7130 is turned to "Off" status (i.e., the assisted chamber control system is configured as first configuration), causing the assisted chamber 5122 to inflate toward the main chamber 5101, such that the neck chamber 5121 is closed (in the closed state) to prevent the jamming material 5140 from passing therethrough or flowing back to the main chamber 5101. This transforms the example soft gripper 5000 to status 5000-3. In jamming stage 8104, the soft gripper 5000 descends toward a target object 8107 until the target is fully contacted with the inflated contract membrane, and at least partially surrounded by the jamming granule 5140. The third valve 7220 is turned to "Off" status (i.e., the main chamber control system is configured in the seventh configuration) to maintain the first pressure within the main chamber, and the example soft gripper is maintained in status 5000-3. In jamming stage 8105, the fourth valve 7230 is turned to "On" status (i.e., the main chamber control system is configured in the sixth configuration), creating negative first pressure in the main chamber. This negative pressure compresses the jamming granule 5140 towards the target object 8107, providing stronger grip while also distributing the forces more evenly across the target object's surface. The gripper is transformed to status 5000-4. Finally, in jamming stage 8106, the fourth valve 7230 is turned to "Off" status (i.e., the main chamber control system is configured in the seventh configuration) such that the first pressure within the main chamber is maintained and target object 8107 is attached to the soft gripper, completing the jamming attachment and allowing the example soft gripper to manipulate (grasping the target object) effectively. In one example, the target object 8107 is a small object, sized smaller than the soft gripper.

Figure 8B:
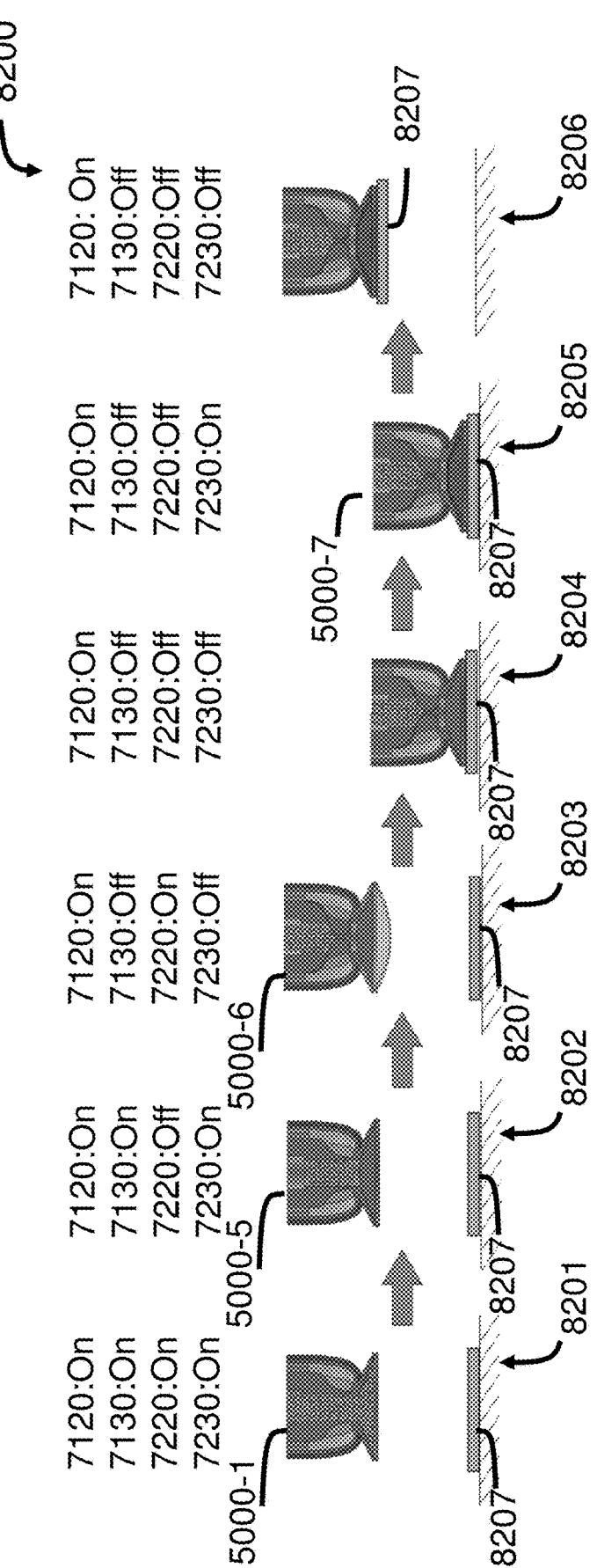

Now referring to FIG. 8B, to achieve suction attachment configuration 8200, a series of actions and steps are executed by the example pneumatic system. Firstly, during the suction stage 8201, the first, second, third, and fourth valves 7120, 7130, 7220, 7230 are all set to "On" status (i.e., the assisted chamber control system and the main chamber control system of the pneumatic system are configured as fourth configuration and eighth configuration, respectively), and the example soft gripper is in its resting status 5000-1, the contact membrane is in the flat state. The example soft gripper is configured to position atop a target object 451. In this example, target object 8207 is a flat, plate-like object having a top surface area larger than the contact membrane. Then, in the following suction stage 8202, by changing third valve 7220 to "Off" status (i.e., the main chamber control system 7200 is configured as sixth configuration), negative first pressure is applied to the main chamber, causing the contact membrane to deflate inward, as a deflated state. This action pushes the jamming granules into the main chamber, transforming the example soft gripper from status 5000-1 to status 5000-5. Next, in suction stage 8203, the second valve 7130 and the fourth valve 7230 are turned to "Off" status, while the third valve 7220 is set to "On" status (i.e., the assisted chamber control system is configured as first configuration, while the main chamber control system is configured as fifth configuration), causing the assisted chambers inflate toward the main chamber, such that the neck chamber is closed (in the closed state) to prevent the jamming materials from passing therethrough or falling back into the suction cup chamber 5111. The contact membrane inflates outward with a relatively small pressure, transforming the example soft gripper to status 5000-6. In suction stage 8204, by changing third valve 7220 to "Off" status (i.e., the main chamber control system 7200 is configured as seventh configuration), the first pressure within the main chamber is maintained, then the example soft gripper descends towards the target object 8207 until the target object 8207 is fully contacted by membrane. In suction stage 8205, the fourth valve 7230 is turned to "On" status (i.e., the main chamber control system is configured as sixth configuration), creating negative first pressure in the main chamber, such that the contact membrane deflates inward, as a deflated state and form a vacuum space between the contact membrane and the target object 8207, transforming the example soft gripper to status 5000-7. Finally, in suction stage 8206, the fourth valve 7230 is switched to "Off" status (i.e., the main chamber control system is configured in the seventh configuration) to maintain the first pressure within the main chamber and the target object 8207 is securely attached to the example soft gripper, completing the suction attachment and enabling the example soft gripper to manipulate (grasping the target object 8207) effectively.

Figure 8C:
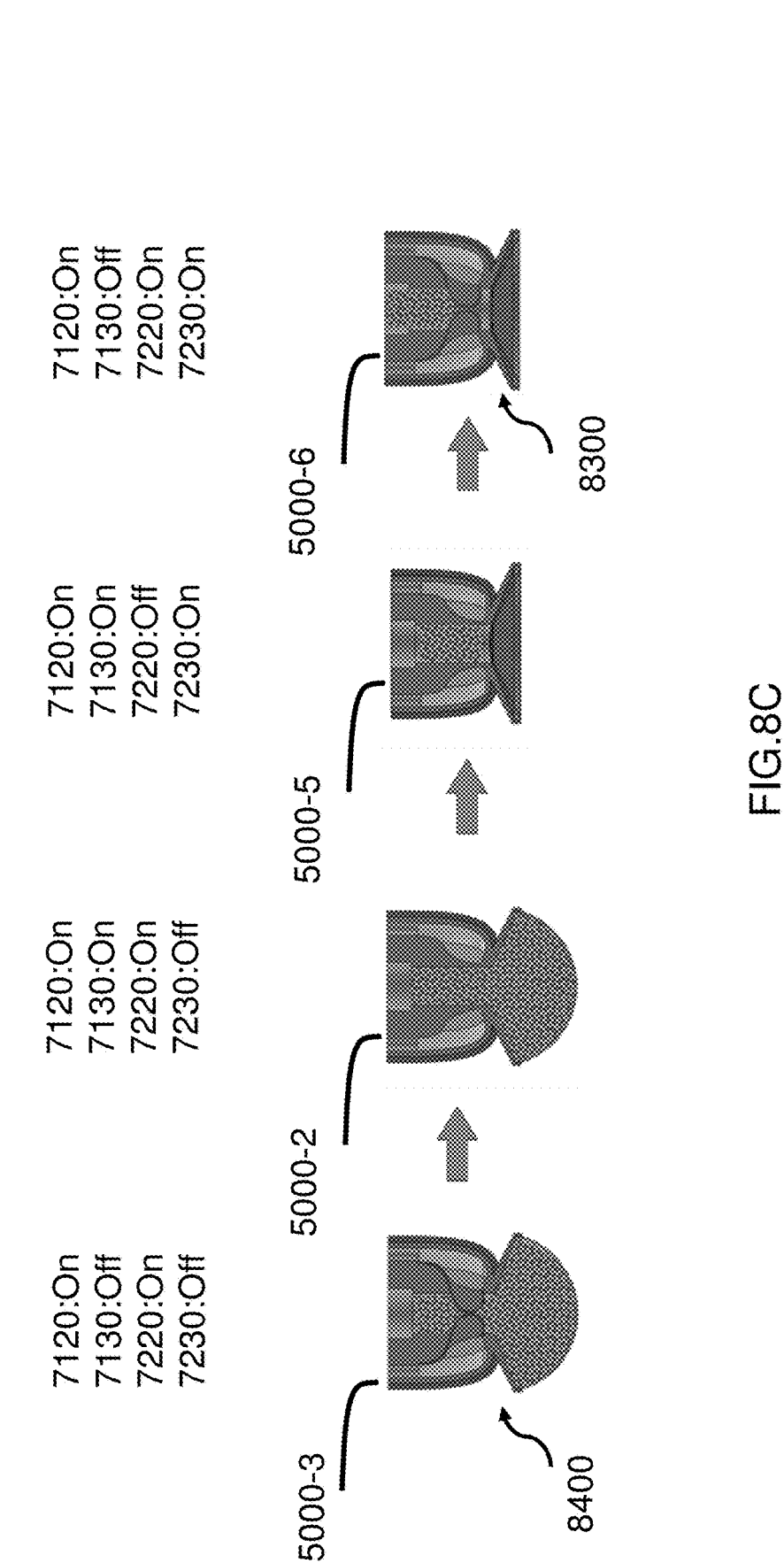

Now referring to FIG. 8C, to achieve the transformation from jamming gripper configuration 8400 to suction gripper configuration 8300 (as first transformation configuration 8301), a series of actions and steps are executed by the example pneumatic system. Firstly, the soft gripper is pre-set in a jamming status 5000-3, with first valve 7120 in "On" status, second valve 7130 in "Off" status, third valve 7220 in "On" status, and fourth valve 7230 in "Off" status (i.e., the assisted chamber control system is configured as first configuration, while the main chamber control system is configured as fifth configuration). Then, second valve 7130 is switched to "On" status (i.e., the assisted chamber control system is configured as fourth configuration), allowing the assisted chamber to create a passage for the jamming granules 5140, and the example soft gripper 5000 transforms from status 5000-3 to status 5000-2. In another implementation, to transform the example soft gripper 5000 transforms from status 5000-3 to status 5000-2, first valve 7120 can be switched to "Off" status while second valve 7130 is switched to "On" status instead (i.e., the assisted chamber control system is configured as second configuration), the second pneumatic source creates a negative, second pressure to the assisted chambers, such that the assisted chambers contract away from the neck chamber, allowing the assisted chamber to create a passage for the jamming granules 5140. Next, third valve 7220 turns to "Off" status, and fourth valve 7230 turns to "On" status (i.e., the main chamber control system of the pneumatic system is in sixth configuration), negative first pressure is applied to the main chamber, causing the contact membrane to deflate inward, as a deflated state. This action pushes the jamming granules into the main chamber, transforming the example soft gripper from status 5000-2 to status 5000-5. Finally, second valve 7130 is turned to "Off" status while third valve 7220 is turned to "On" status (i.e., the assisted chamber control system is configured as first configuration, while the main chamber control system is configured as eight configuration), such that the neck chamber is closed (in the closed state) to prevent the jamming material from passing therethrough or falling back into the suction cup chamber. The example soft gripper transforms from status 5000-5 to status 5000-6. At this point, the example soft gripper is ready for suction-based grasping.

Figure 8D:
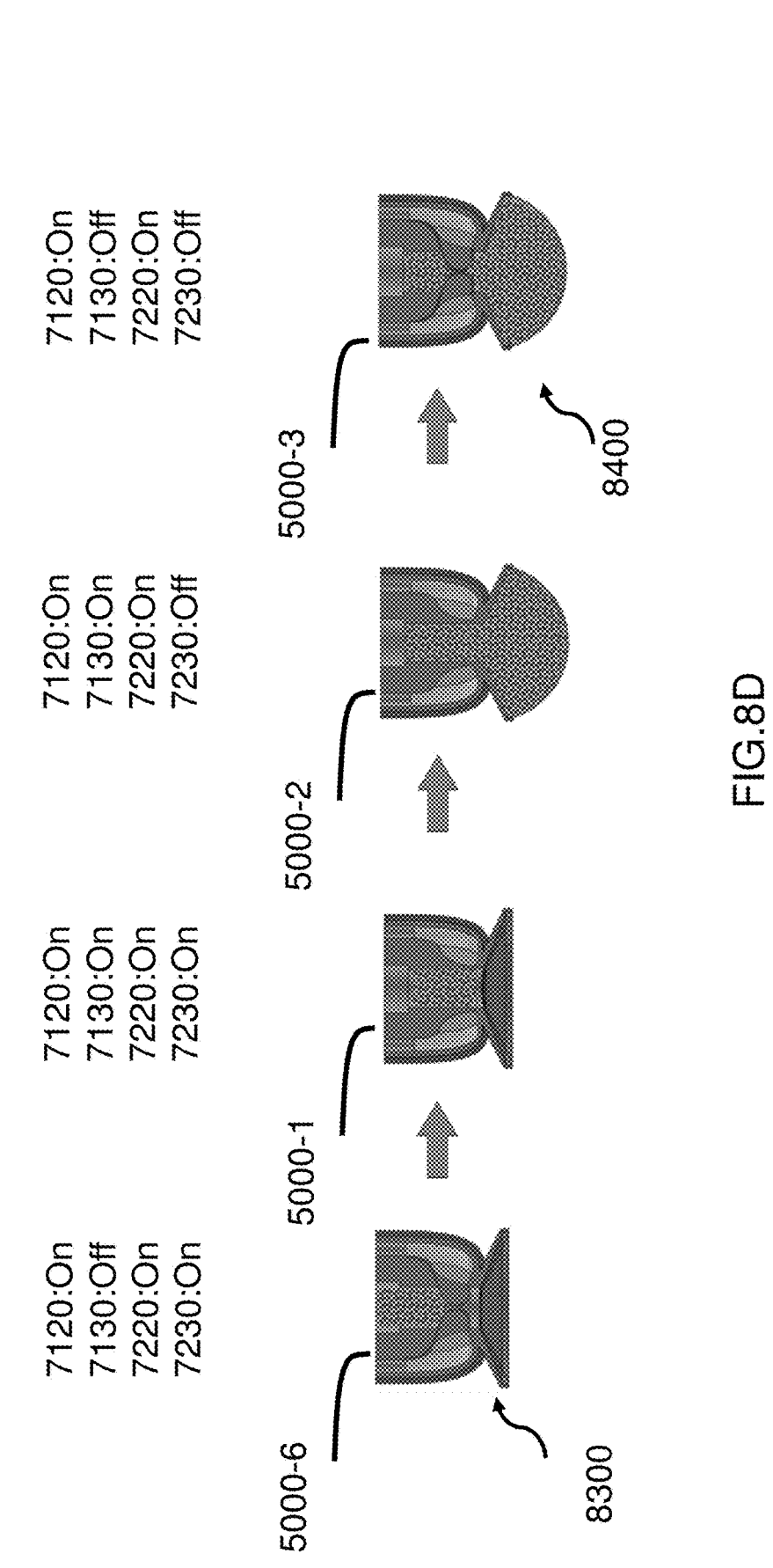
Figure 9:
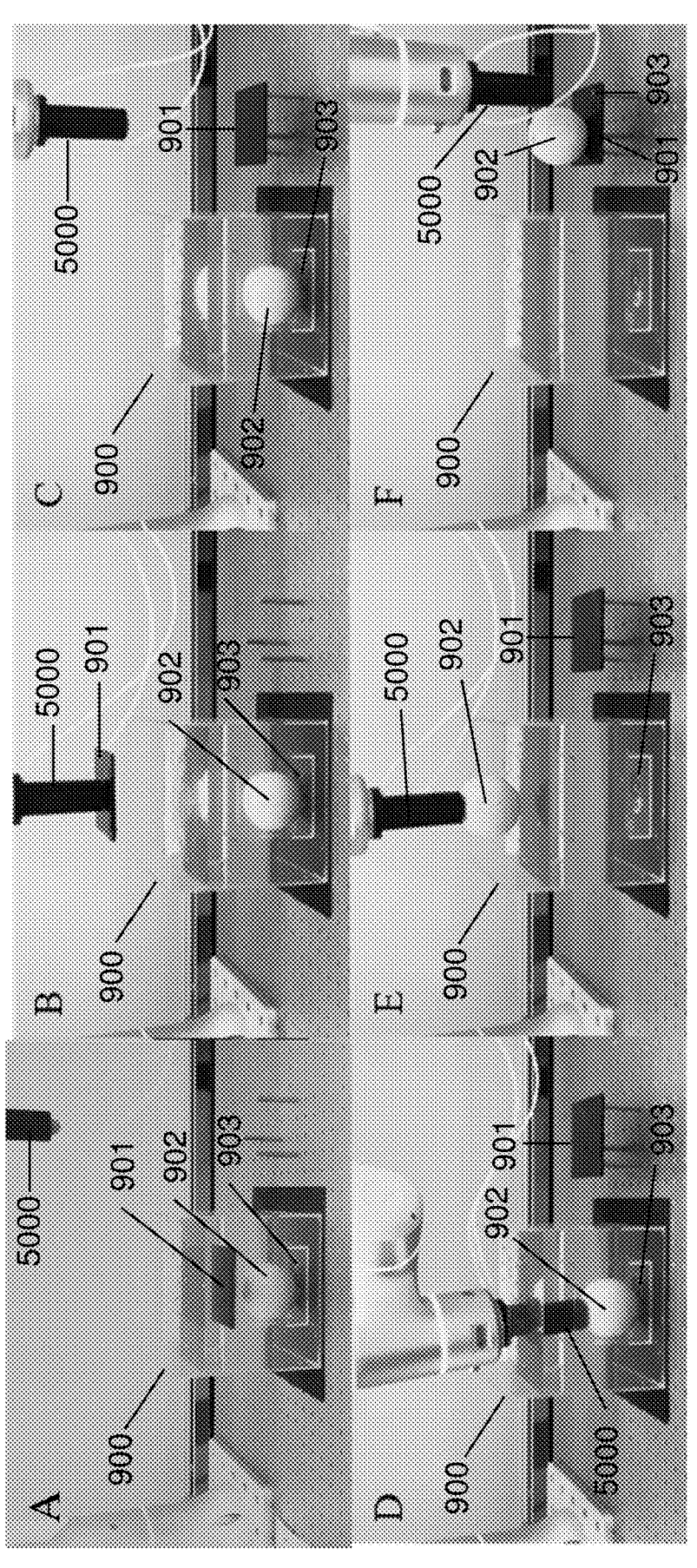
FIG. 9 is a series of photographs (A-F) of an example embodiment of an example controlling scheme of an example soft gripper handling various objects.

Now referring to FIG. 8D, to achieve the transformation from suction gripper configuration 8300 to jamming gripper configuration 8400 (second transformation configuration 8401), a series of actions need to be taken by the example pneumatic system. Firstly, the example soft gripper is in a suction status 5000-6, with first valve 7120 in "On" status, second valve 7130 in "Off" status, third valve 7220 in "On" status, and fourth valve 7230 in "On" status (i.e., the assisted chamber control system and the main chamber control system of the pneumatic system are configured as first configuration and eighth configuration, respectively). The process begins with changing second valve 7130 to "On" status (i.e., the assisted chamber control system is configured as fourth configuration), such that the second pressure within the assisted chambers and the first pressure within the main chamber are substantially equal to atmospheric pressure, and that the assisted chamber 5122 contract away from the neck chamber 5121, allowing the jamming material 5140 passing therethrough, as an open state. This leads to the transformation of the example soft gripper from status 5000-6 to status 5000-1. Subsequently, by changing fourth valve 7230 to "Off" status (i.e., the main chamber control system is configured as fifth configuration), creating a positive, first pressure to the main chamber, such that the contact membrane inflates outward, as an inflated state, allowing the jamming granules to drop into the expanded space. The example soft gripper transforms from status 5000-1 to status 5000-2. In the jamming stage, second valve 7130 is turned to "Off" status (i.e., the assisted chamber control system is configured as first configuration), creating a positive, second pressure to the assisted chambers, such that the chambers expand towards the neck chamber, thereby closing the neck chamber to prevent the jamming material from passing therethrough and flowing back to the main chamber, as a closed state. Consequently, the example soft gripper transforms to status 5000-3, making it ready for jamming-based grasping.

Example 10

In this example, one implementation of the example transformable soft gripper 5000 as described in Example 6, the fabrication method thereof as described in Example 7, the pneumatic system 7000 for controlling the soft gripper

5000 as described in Example 8, and the method of controlling the soft gripper 5000 as described in Example 9 will be described herein in more details. Structures or features similar to previous examples will not be repeated for the sake of brevity.

Example Soft Gripper

Referring to FIGS. 5A and 5B, the example soft gripper 5000 generally contains a main body 5100 and a contact membrane 5130. The main body 5100 contains a suction cup portion 5110, the neck portion 5120 is extended from the suction cup portion 5110 and defines a neck chamber 5121 therein. The suction cup portion 5110 defines a suction cup chamber therein. The neck chamber 5121 and the suction cup chamber together form a main chamber 5101 defined by the main body 5100 and the contact membrane 5130. The neck chamber 5121 contains or connects with a main chamber air tube 5200. The neck portion 5120 contains two separate assisted chambers 5122, and each assisted chamber 5122 contains or connects with the assisted chamber air tube 5300 to connect with the neck chamber 5121. All these parts are made of flexible materials:

In this example, the main chamber air tube 5200 is about 100 mm long and is made of Thermoplastic Urethane (TPU).

In this example, the two assisted chamber air tubes 5300 are about 100 mm long and made of TPU.

In this example, the main body 5100 is in the form of an inverted funnel and is substantially made of DragonSkin 30. The smaller end of the funnel has a diameter of about 15 mm and the larger end of the funnel has a diameter of about 20 mm. The main chamber 5101 is about 8 mm in diameter.

In this example, the suction cup portion 5110 is a flexible, concave-shaped cup made from TPU. The overall shape of this portion is akin to a cone with a vertical extension in the widened direction of the cone.

In this example, the contact membrane 5130 is a cylindrical film with about 20 mm in diameter and about 1.15 mm in thickness. The contact membrane 5130 is made of Ecoflex-0030™. By the way of example, the contact membrane 5130 can have a variety of patterns or designs on its surface, including but not limited to raised dots, recessed pits, and coatings of different materials.

Example Fabrication Process

Referring to FIGS. 6A-6C, the example fabrication process of the example soft gripper 5000 generally contains 3 steps:

Step 1: fabricating a main body with a main body mold generally includes a lower main body mold 6100 to form a lower main body 5150 and an upper main body mold 6200 to form the upper main body 5160 (or upper portion). The lower main body mold 6100 generally contains top fixer 6102, close cap 6101, left outer shell 6106, left inner shell 6105, right inner shell 6104, right inner shell 6103, and base mold 6107. A first flexible material is poured into the lower main body mold 6100 which is then cured as the lower main body 5150 and the upper main body mold 6200 which is then cured as the cap or the upper main body 5160 for the lower main body 5150 and form the main body 5100.

Step 2: Providing a contact membrane 5130 by providing a membrane mold 6001 sized and shaped to form the contact membrane 5130 and curing a second flexible material that is more flexible than the first flexible material into the membrane mold 6001.

Step 3: Attaching or adhering the contact membrane 5130 to the main body 5100 to seal the bottom end opening of the lower main body 5150 using such as silicone rubber adhesive. Additionally or optionally, attaching or adhering the main chamber air tube 5200 and assisted chamber air tubes 5300 onto the top opening of the main body 5100 to connect with the main chamber and assisted chambers, respectively, such as with silicone rubber adhesive. Then, filling suitable amounts of jamming granule 5140 to the main chamber air tube 5200.

In this example, the lower main body mold 6100 in Step 1 is made by assembling the SLA-3D-Printed top fixer 6102, the SLA-3D-Printed close cap 6101, the SLA-3D-Printed left outer shell 6106, the SLA-3D-Printed left inner shell 6105, the SLA-3D-Printed right inner shell 6104, the SLA-3D-Printed right inner shell 6103. The first flexible material used is about 15 g of DragonSkin 30™ silicone gel which is poured via the top opening of the top fixer 6102 and let the lower main body mold 6100 sit for about 20 minutes in the vacuum environment. After about 20 minutes, remove the lower main body mold 6100 from the vacuum environment. Let the lower main body mold 6100 sit for 16 hours to allow the DragonSkin 30™ silicone rubber to cure the lower main body 5150. Then, remove the lower main body mold 6100.

In this example, the first flexible material used to fill the upper main body mold 6200 in Step 1 is about 5 g of DragonSkin 30™ silicone rubber (Smooth-On, Inc.). The filled upper main body mold 6200 which is then sited in a vacuum environment for about 20 minutes. After the said-time, the upper main body mold 6200 is removed from the vacuum environment, and attach the upper main body 5160 to the bottom of the upper main body mold 6200. Let them sit for about 4 hours to allow the DragonSkin 30™ silicone rubber to cure a cap for the lower main body 5150 and become the main body 5100. Then, remove the upper main body mold 6200 from the main body 5100.

In this example, the second flexible material used to fill the membrane mold 6001 in Step 2 is about 2 g of Ecoflex-0030™ silicone rubber. Then, the filled membrane mold 6001 is put in a vacuum environment for 5 minutes. After the said period, the membrane mold 6001 is removed from the vacuum chamber and sited for 4 hours, allowing the Ecoflex-0030™ silicone rubber to cure and form the contact membrane 5130.

In this example, the silicone rubber adhesive used in Step 3 is silicone rubber adhesive Sil-Poxy™. The jamming granule 5140 used is about 10 g of dry coffee grounds is filled into the main chamber air tube 5200 once the adhesive has cured.

Example Pneumatic System and Method of Controlling

Referring to FIGS. 5A, 5B and 7, the example pneumatic control system 7000 generally contains two control systems, the assisted chamber control system 7100 and the main chamber control system 7200. The assisted chamber control system 7100 is directly or indirectly connected with and/or is in air communication with the assisted chambers 5122, for example by assisted chamber air tubes 5300, and is configured to provide and control a second pressure within the assisted chambers 5122. The assisted chamber control system 7100 generally contains a second pneumatic source 7110, a first valve 7120, a second valve 7130 and a pressure gauge 7180, and the valves are configured to be switchable between On status and Off status. The On status and Off status of the first valve 7120 and the second valve 7130 control the assisted chambers 5122, to deflate or contract, open the neck chamber 5121 as an open state and allowing jamming materials 5140 to pass through the neck chamber 5121 of the main chamber 5101, to inflate or expand towards the neck chamber 5121 of the main chamber 5101, thereby closing the neck chamber 5121 as a closed state to effectively prevent jamming granules 5140 from passing through the main chamber 5101. The main chamber control system 7200 generally contains a first pneumatic source 7210, a third valve 7220, a fourth valve 7230 and a pressure gauge 7280, and the valve are configured to be switchable between On status and Off status. The On status and Off status of the third valve 7220 and a fourth valve 7230 control the transmission of a positive first pressure to the main chamber 5101 which causes the contact membrane 5130 to inflate outward as in inflated state, or to deflate inward as a deflated state.

In various industrial production or underwater object retrieval scenarios, actuators often face numerous challenges. These challenges include the necessity to operate both on the water surface and underwater, or the requirement to remove larger object(s) or debris before picking up smaller target object(s).

Now referring to FIGS. 5A, 5B, 7, 8B and 9, showing an example controlling scheme of the example soft gripper 5000, which can handle complex situations with various sizes and shapes of target objects under different media. In this example, the soft gripper 5000 was operatively connected with a robotic end effector. Multiple target objects were provided in a container and were immersed in water. In this container, a piece of green bean 903 (diameter around 2.4 mm; target object #3) and a piece of pear 902 (with a diameter of around 75 mm and height of around 67.5 mm; target object #2) were disposed inside an acrylic box 900, closed with a cover 901 (target object #1). In this example, the first, second, third and fourth valves 7120, 7130, 7220, 7230 were initially all configured in "On" status (A) (i.e., the assisted chamber control system and the main chamber control system of the pneumatic system were configured as fourth configuration and eighth configuration, respectively). The soft gripper 5000 was in its resting status 5000-1 and was placed on the top of an about 15 cm×15 cm acrylic box 900. Next, during the suction stage 8202, the third valve 7220 was switched to "Off" status (i.e., the main chamber control system was configured as sixth configuration), allowing a −25 kPa pressure to be transmitted to the main chamber 5101. This action caused the contact membrane 5130 to deflate inward, pushing the jamming granule 5140 to the main chamber 5101. The soft gripper 5000 was transformed from status 5000-1 to status 5000-5. Subsequently, the second and the fourth valves 7130 and 7230 were turned to "Off" status, while the third valve 7220 was turned to "On" status (i.e., the assisted chamber control system and the main chamber control system of the pneumatic system were configured as first configuration and fifth configuration, respectively). This caused the assisted chamber 5122 to inflate toward the main chamber 5101, preventing the jamming granule 5140 from dropping back to the suction cup 104. The contact membrane 5130 was inflated outward with a 2 kPa pressure, making the soft gripper 5000 transform to status 5000-6. During the next phase, in suction stage 8204, the soft gripper 5000-6 descended towards the acrylic box 900 until the acrylic box 900 was fully contacted by the membrane 5130. The third valve 7220 was turned to "Off" stats, while the fourth valve 7230 was then turned to "On" status (i.e., the main chamber control system was configured as sixth configuration), allowing a −25 kPa pressure to be transmitted to the main chamber 5101. It created a vacuum space between the contact membrane 5130 and the acrylic box 900. This transformation turned the soft gripper 5000 to status 5000-7. Finally, the fourth valve 7230 was turned to "Off" status (i.e., the main chamber control system was configured as seventh configuration), allowing the target object #1 (cover 901) to adhere to the soft gripper 5000 (B). The soft gripper 5000 removed the target object #1 (top or cover 901 of acrylic box 900) (C). After this action, the soft gripper 5000 transformed from the suction gripper configuration 8300 to the jamming gripper configuration 8400 (second transformation configuration 8401). The second valve 7130 was turned to "Off" status (i.e., the assisted chamber control system was configured as first configuration), causing the assisted chamber 5122 to inflate towards the main chamber 5101, preventing the jamming granule 5140 from flowing back to the main chamber 5101. This transformation turned the soft gripper 5000 into status 5000-3. The soft gripper 5000 then moved down towards the pear 902 (target object #2) with an about 75 mm diameter inside the acrylic box 900. The gripper continued its operation until the pear 902 was completely surrounded by the jamming granule 5140 (D). The fourth valve 7230 was subsequently turned to "On" status (i.e., the main chamber control system is configured as sixth configuration), applying a −25 kPa pressure to the main chamber 5101. This compressed the jamming granule 5140 towards the target object #2 (pear 902) and transformed the soft gripper 5000 to status 5000-4. Finally, the fourth valve 7230 was turned to "Off" status (i.e., the main chamber control system was configured as seventh configuration), securing the target object #2 (pear 902) to the soft gripper 5000 in status 5000-4 (E). The soft gripper 5000 attached to the pear 902 and removed it from the acrylic box 900, exposing the target object #3 (green bean 903). The target object #3 (green bean 903) was subsequently removed from the acrylic box 900 with the same second transformation configuration 8401 (F), after the larger target object #2 (pear 902) was removed.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the components of the soft gripper such as neck portion, suction cup portion, jamming granules and the contact membrane may have different numbers, sizes, shapes (regular or irregular), configurations and be made of different materials.

For example, the soft gripper may be fabricated by other available processes, means or methods in the art.

For example, in certain examples, example pneumatic control systems have been described, but the assisted chambers and the main chamber of the soft gripper may be controlled by other pneumatic control systems.

For example, in certain examples, 2/3-way electric valves are used in the systems, but other (same or different) suitable valves available in the art may be used instead.

For example, in certain examples, air compressor is used in the systems, but other pneumatic source available in the art may be used instead.

For example, in certain examples, jamming granules are used in the soft grippers, but other forms of jamming materials, such as powder, grains, beads, flakes etc. and combination thereof, in various sizes, shapes, materials and amount may be used.

For example, in certain examples, the main body is formed by providing a lower main body and then subsequently an upper main body, but other sequences or other methods of forming the main body known in the art may be used instead.

Numbered Embodiments

Set 1

Embodiment 1. A soft gripper having a proximal side and a distal side, comprising: a main body comprising a suction cup portion that comprises an open end at the proximal side; and a neck portion that is connected with or extended from the suction cup portion; and a contact membrane, configured to seal the open end, wherein the neck portion comprises a neck chamber therein and the suction cup portion comprises a suction cup chamber therein, the neck chamber and the suction cup chamber together form a main chamber that is configured to be in gas communication with a first pneumatic source and to receive a jamming material, and wherein the neck portion further comprises at least one assisted chambers therein, each are disposed around the neck portion and configured to be in gas communication with a second pneumatic source.

Embodiment 2. The soft gripper of embodiment 1, wherein the contact membrane is deformable between an inflated state, a flat state and a deflated state under control of the first pneumatic source, and wherein the neck chamber is deformable at least between an open state and closed state under control of the second pneumatic source, such that the soft gripper is configured to be switchable at least between a suction gripper configuration and a jamming gripper configuration.

Embodiment 3. The soft gripper of any one of the preceding embodiments, further comprising a main chamber air tube in gas communication between the main chamber and the first pneumatic source; and at least one assisted chamber air tubes in gas communication between the at least one assisted chambers and the second pneumatic source.

Embodiment 4. The soft gripper of any one of the preceding embodiments, wherein the main body comprises an upper portion and a lower portion connected with each other.

Embodiment 5. A fabrication method of the soft gripper as mentioned in any one of the preceding embodiments, comprising the following steps: (1) providing a main body mold sized and shaped to form the main body and curing a first flexible material into the main body mold, thereby forming the main body; (2) providing a membrane mold sized and shaped to form the contact membrane and curing a second flexible material that is more flexible than the first flexible material into the membrane mold, thereby forming the membrane; and (3) attaching the contact membrane to the main body, thereby forming the soft gripper.

Embodiment 6. The method of embodiment 5, wherein the main body comprises an upper portion and a lower portion, wherein the step (1) comprises the steps of: (a) providing a first main body mold for the lower portion and introducing a first flexible material into the first main body mold, and curing the flexible material, thereby forming the upper portion; and (b) providing a second main body mold for the upper portion and introducing a first flexible material into the second main body mold, disposing the upper portion to the second main body mold, and curing the flexible material, thereby forming the upper portion onto the lower portion, such that the main body is formed.

Embodiment 7. The method of embodiment 6, wherein further comprising the step of: attaching a main chamber air tube and at least one assisted chamber air tubes to the main chamber and the at least one assisted chambers, respectively.

Embodiment 8. The method of any one of the embodiments 5-7, wherein the first flexible material is selected from a group consisting of: rubber, silicone rubber (e.g., Dragon Skin 0030, Dragon Skin 0010, RTV Silicone rubber) and combination thereof; the second flexible material is selected from a group consisting of: rubber, silicone rubber (e.g., Dragon Skin 0030, Dragon Skin 0010, RTV Silicone rubber) and combination thereof; and/or the adhesive is selected from a group consisting of: silicone rubber adhesive, sil-Poxy, dopamine based adhesive nano-coatings, hyaluronic acid hydrogel adhesive and combination thereof.

Embodiment 9. The method of any one of the embodiments 5-8, wherein further comprising steps of: attaching the main chamber air tube, the at least one assisted chamber air tubes to the main chamber and the assisted chambers, respectively; and/or providing a jamming material into main chamber.

Embodiment 10. A pneumatic system for controlling the soft gripper as mentioned in any one of embodiments 1-4, comprising: an assisted chamber control system, comprising: a second pneumatic source, configured to provide a second pressure; a first valve connected between outlet of the second pneumatic source and the at least one assisted chambers; and a second value connected between inlet of the second pneumatic source and the at least one assisted chambers; and a main chamber control system, comprising: a first pneumatic source configured to provide a first pressure; a third valve connected between outlet of the first pneumatic source and the main chamber; and a fourth value connected between inlet of the first pneumatic source and the main chamber.

Embodiment 11. The pneumatic system of embodiment 10, wherein the first valve, the second valve, the third valve and/or the fourth valve is a 2/3-way electric valve switchable between On state and Off status.

Embodiment 12. The pneumatic system of embodiment 10 or embodiment 11, wherein the assisted chamber control system comprises a first configuration, a second configuration, a third configuration, and a fourth configuration, wherein the first configuration comprises the first valve being configured in On status and the second valve being configured in Off status, the second pneumatic source creates a positive, second pressure to the at least one assisted chambers, such that the at least one assisted chambers expands towards the neck chamber, thereby closing the neck chamber to prevent the jamming material from passing therethrough, as a closed state; wherein the second configuration comprises the first valve being configured in Off status and the second valve being configured in On status, the second pneumatic source creates a negative, second pressure to the at least one assisted chambers, such that the at least one assisted chambers contract away from the neck chamber, allowing the jamming material passing therethrough, as an open state; wherein the third configuration comprises the first valve and the second valve being configured in the Off status, the second pressure within the assisted chambers is maintained; and wherein the fourth configuration comprises the first valve and the second valve being configured in the On status, the second pressure within the at least one assisted chambers is substantially equal to atmospheric pressure; and wherein the main chamber control system comprises a fifth configuration, a sixth configuration, a seventh configuration, an eighth configuration, wherein the fifth configuration comprises the third valve being configured in On status and the fourth valve being configured in Off status, the first pneumatic source creates a positive, first pressure to the main chamber, such that the contact membrane inflates outward, as an inflated state; wherein the sixth configuration comprises the third valve being configured in Off status and the fourth valve being configured in On status, the first pneumatic source creates a negative, first pressure to the main chamber, such that the contact membrane deflates inward, as a deflated state; wherein the seventh configuration comprises the third valve and the fourth valve being configured in the Off status, the first pressure within the main chamber is maintained; and wherein the eighth configuration comprises the third valve and the fourth valve being configured in the On status, the first pressure within the main chamber is substantially equal to atmospheric pressure.

Embodiment 13. A method of controlling the soft gripper as mentioned in any one of embodiments 1-4 using the pneumatic system as mentioned in embodiment 12, comprising one or more of the steps of: (i) grasping a target object in a jamming attachment configuration; (ii) grasping a target object in a suction attachment configuration; (iii) transforming from the jamming attachment configuration to the suction attachment configuration; and/or (iv) transforming from the suction gripper configuration to the jamming gripper configuration.

Embodiment 14. The method of embodiment 13, wherein the step (i) comprises the steps of: (i-i) configuring the assisted chamber control system in the fourth configuration and the main chamber control system in eighth configuration, such that the soft gripper is in resting state; (i-ii) configuring the main chamber control system in fifth configuration, such that the contact membrane inflates outward as the inflated state; (i-iii) disposing the soft gripper proximate to a target object until the target object is fully contacted with the inflated contact membrane; (i-iv) configuring the assisted chamber control system in the first configuration, such that the neck chamber is closed to prevent the jamming material from passing therethrough in the closed state; (i-v) configuring the main chamber control system in the seventh configuration, such that the first pressure within the main chamber is maintained; (i-vi) configuring the main chamber control system in the sixth configuration, creating a negative, first pressure to the main chamber; and (i-vii) configuring the main chamber control system in the seventh configuration, such that the first pressure within the main chamber is maintained, thereby jamming attachment for grasping target object is performed.

Embodiment 15. The method of embodiment 13, wherein the step (ii) comprises the steps of: (ii-i) configuring the assisted chamber control system in the fourth configuration and the main chamber control system in the eighth configuration, such that the soft gripper is in resting state; (ii-ii) configuring the main chamber control system in the six configuration, such that the contact membrane deflates inward in the deflated state; (ii-iii) configuring the assisted chamber control system in the first configuration and the main chamber control system in the fifth configuration, such that closing the neck chamber to prevent the jamming material from passing therethrough, as a closed state, and the contact membrane inflates outward, as an inflated state; (ii-iv) disposing the soft gripper proximate to a target object until the target object is fully contacted with the contact membrane; (ii-v) configuring the main chamber control system in the seventh configuration, such that the first pressure within the main chamber is maintained; (ii-vi)

configuring the main chamber control system in the sixth configuration, such that the contact membrane deflates inward, as a deflated state; and (ii-vii) configuring the main chamber control system in the seventh configuration, such that the first pressure within the main chamber is maintained, thereby suction attachment for grasping target object is performed.

Embodiment 16. The method of embodiment 13, wherein step (iii) comprises the steps of: (iii-i) configuring the assisted chamber control system in the first configuration and the main chamber control system in the fifth configuration; (iii-ii) configuring the assisted chamber control system in the fourth configuration, such that the neck chamber is open; (iii-iii) configuring the main chamber in the sixth configuration, such that the contact membrane deflates inward in the deflated state, thereby the jamming material being pushed to the main chamber; and (iii-iv) configuring the assisted chamber in the first configuration and the main chamber in the eighth configuration, such that the neck chamber is closed to prevent the jamming material from passing therethrough in the closed state, thereby transforming from the jamming attachment configuration to the suction attachment configuration.

Embodiment 17. The method of embodiment 13, wherein step (iv) comprises the steps of: (iv-i) configuring the assisted chamber control system in the first configuration and the main chamber control system in the eighth configuration; (iv-ii) configuring the assisted chamber control system in the fourth configuration, such that a pathway in the assisted chamber for the jamming granule is opened; (iv-iii) configuring the main chamber control system in the fifth configuration, such that the contact membrane inflates outward, as an inflated state; (iv-iv) configuring the assisted chamber in the first configuration, such that the neck chamber is closed to prevent the jamming material from passing therethrough in the closed state.

Set 2

Embodiment 1. A soft gripper having a proximal side and a distal side, comprising: a main body comprising a suction cup portion that comprises an open end at the proximal side; and a neck portion that is connected with or extended from the suction cup portion; and a contact membrane, configured to seal the open end, wherein the neck portion comprises a neck chamber therein and the suction cup portion comprises a suction cup chamber therein, the neck chamber and the suction cup chamber together form a main chamber that is configured to be in gas communication with a first pneumatic source and to receive a jamming material, and wherein the neck portion further comprises at least one assisted chambers therein, each are disposed around the neck chamber and configured to be in gas communication with a second pneumatic source.

Embodiment 2. The soft gripper of embodiment 1, wherein the contact membrane is deformable between an inflated state, a flat state and a deflated state under control of the first pneumatic source, and wherein the neck chamber is deformable at least between an open state and closed state under control of the second pneumatic source, such that the soft gripper is configured to be switchable at least between a suction gripper configuration and a jamming gripper configuration.

Embodiment 3. The soft gripper of any one of the preceding embodiments, further comprising a main chamber air tube in gas communication between the main chamber and the first pneumatic source; and at least one assisted chamber air tubes in gas communication between the at least one assisted chambers and the second pneumatic source.

Embodiment 4. The soft gripper of any one of the preceding embodiments, wherein the main body is made of a first flexible material and the contact membrane is made of a second flexible material, wherein the first flexible material and/or the second flexible material is selected from a group consisting of: rubber, silicone rubber and combination thereof; and wherein the second flexible material is more flexible than the first flexible material.

Embodiment 5. The soft gripper of embodiment 4, wherein the first flexible material is selected from a group consisting of DragonSkin 30, DragonSkin 10, RTV Silicone rubber and combination thereof; and/or the second flexible material is selected from a group consisting of Ecoflex 30, Ecoflex 10 and combination thereof.

Embodiment 6. A fabrication method of the soft gripper as described in any one of the preceding embodiments, comprising the following steps: (1) providing a main body mold sized and shaped to form the main body and curing a first flexible material into the main body mold, thereby forming the main body; (2) providing a membrane mold sized and shaped to form the contact membrane and curing a second flexible material into the membrane mold, thereby forming the membrane; and (3) attaching the contact membrane to the main body, thereby forming the soft gripper.

Embodiment 7. The method of embodiment 6, wherein the main body comprises an upper portion and a lower portion, wherein the step (1) comprises the steps of: (a) providing a lower main body mold for the lower portion and introducing a first flexible material into the lower main body mold, and curing the flexible material, thereby forming the lower portion; and (b) providing an upper main body mold for the upper portion and introducing a first flexible material into the second main body mold, disposing the lower portion to the second main body mold, and curing the first flexible material, thereby forming the upper portion onto the lower portion, such that the main body is formed.

Embodiment 8. The method of embodiment 7, wherein further comprising the step of: attaching or inserting a main chamber air tube and at least one assisted chamber air tubes to the main chamber and the at least one assisted chambers, respectively.

Embodiment 9. The method of any one of the embodiments 6-8, wherein the first flexible material and/or the second flexible material is selected from a group consisting of: rubber, silicone rubber and combination thereof; and wherein the second flexible material is more flexible than the first flexible material.

Embodiment 10. The method of any one of the embodiments 6-9, wherein the first flexible material is selected from a group consisting of DragonSkin 30, DragonSkin 10, RTV Silicone rubber and combination thereof, and/or the second flexible material is selected from a group consisting of Ecoflex 30 or Ecoflex 10.

Embodiment 11. The method of any one of embodiments 6-10, wherein the step (3) attaching the contact membrane to the main body is performed with an adhesive that is selected from a group consisting of: silicone rubber adhesive, sil-Poxy, dopamine based adhesive nano-coatings, hyaluronic acid hydrogel adhesive and combination thereof.

Embodiment 12. The method of any one of the embodiments 6-11, wherein further comprising steps of: attaching the main chamber air tube, the at least one assisted chamber air tubes to the main chamber and the assisted chambers, respectively; and/or providing a jamming material into main chamber.

Embodiment 13. A pneumatic system for controlling the soft gripper as described in any one of embodiments 1-5, comprising: an assisted chamber control system, comprising: a second pneumatic source, configured to provide a second pressure; a first valve connected between outlet of the second pneumatic source and the at least one assisted chambers; and a second value connected between inlet of the second pneumatic source and the at least one assisted chambers; and a main chamber control system, comprising: a first pneumatic source configured to provide a first pressure; a third valve connected between outlet of the first pneumatic source and the main chamber; and a fourth value connected between inlet of the first pneumatic source and the main chamber.

Embodiment 14. The pneumatic system of embodiment 13, wherein the first valve, the second valve, the third valve and/or the fourth valve is a 2/3-way electric valve switchable between On status and Off status.

Embodiment 15. The pneumatic system of embodiment 13 or embodiment 14, wherein the assisted chamber control system comprises a first configuration, a second configuration, a third configuration, and a fourth configuration, wherein the first configuration comprises the first valve being configured in On status and the second valve being configured in Off status, the second pneumatic source creates a positive, second pressure to the at least one assisted chambers, such that the at least one assisted chambers expands towards the neck chamber, thereby closing the neck chamber to prevent the jamming material from passing therethrough, as a closed state; wherein the second configuration comprises the first valve being configured in Off status and the second valve being configured in On status, the second pneumatic source creates a negative, second pressure to the at least one assisted chambers, such that the at least one assisted chambers contract away from the neck chamber, allowing the jamming material passing therethrough, as an open state; wherein the third configuration comprises the first valve and the second valve being configured in the Off status, the second pressure within the assisted chambers is maintained; and wherein the fourth configuration comprises the first valve and the second valve being configured in the On status, the second pressure within the at least one assisted chambers is substantially equal to atmospheric pressure; and wherein the main chamber control system comprises a fifth configuration, a sixth configuration, a seventh configuration, an eighth configuration, wherein the fifth configuration comprises the third valve being configured in On status and the fourth valve being configured in Off status, the first pneumatic source creates a positive, first pressure to the main chamber, such that the contact membrane inflates outward, as an inflated state; wherein the sixth configuration comprises the third valve being configured in Off status and the fourth valve being configured in On status, the first pneumatic source creates a negative, first pressure to the main chamber, such that the contact membrane deflates inward, as a deflated state; wherein the seventh configuration comprises the third valve and the fourth valve being configured in the Off status, the first pressure within the main chamber is maintained; and wherein the eighth configuration comprises the third valve and the fourth valve being configured in the On status, the first pressure within the main chamber is substantially equal to atmospheric pressure.

Embodiment 16. A method of controlling the soft gripper as described in any one of embodiments 1-5 using the pneumatic system as described in embodiment 15, comprising one or more of the steps of: (i) grasping a target object in a jamming attachment configuration; (ii) grasping a target object in a suction attachment configuration; (iii) transforming from the jamming attachment configuration to the suction attachment configuration; and/or (iv) transforming from the suction gripper configuration to the jamming gripper configuration.

Embodiment 17. The method of embodiment 16, wherein the step (i) comprises the steps of: (i-i) configuring the assisted chamber control system in the fourth configuration and the main chamber control system in eighth configuration, such that the soft gripper is in resting state; (i-ii) configuring the main chamber control system in fifth configuration, such that the contact membrane inflates outward as the inflated state; (i-iii) configuring the assisted chamber control system in the first configuration, such that the neck chamber is closed to prevent the jamming material from passing therethrough in the closed state; (i-iv) disposing the soft gripper proximate to a target object until the target object is fully contacted with the inflated contact membrane; (i-v) configuring the main chamber control system in the seventh configuration, such that the first pressure within the main chamber is maintained; (i-vi) configuring the main chamber control system in the sixth configuration, creating a negative, first pressure to the main chamber; and (i-vii) configuring the main chamber control system in the seventh configuration, such that the first pressure within the main chamber is maintained, thereby jamming attachment for grasping target object is performed.

Embodiment 18. The method of any one of the embodiments 16-17, wherein the step (ii) comprises the steps of: (ii-i) configuring the assisted chamber control system in the fourth configuration and the main chamber control system in the eighth configuration, such that the soft gripper is in resting state; (ii-ii) configuring the main chamber control system in the six configuration, such that the contact membrane deflates inward in the deflated state; (ii-iii) configuring the assisted chamber control system in the first configuration and the main chamber control system in the fifth configuration, such that closing the neck chamber to prevent the jamming material from passing therethrough, as a closed state, and the contact membrane inflates outward, as an inflated state; (ii-iv) disposing the soft gripper proximate to a target object until the target object is fully contacted with the contact membrane; (ii-v) configuring the main chamber control system in the seventh configuration, such that the first pressure within the main chamber is maintained; (ii-vi) configuring the main chamber control system in the sixth configuration, such that the contact membrane deflates inward, as a deflated state; and (ii-vii) configuring the main chamber control system in the seventh configuration, such that the first pressure within the main chamber is maintained, thereby suction attachment for grasping target object is performed.

Embodiment 19. The method of any one of the embodiments 16-18, wherein step (iii) comprises the steps of: (iii-i) configuring the assisted chamber control system in the first configuration and the main chamber control system in the fifth configuration; (iii-ii) configuring the assisted chamber control system in the fourth configuration or the sixth configuration, such that the neck chamber is open; (iii-iii) configuring the main chamber in the sixth configuration, such that the contact membrane deflates inward in the deflated state, thereby the jamming material being pushed to the main chamber; and (iii-iv) configuring the assisted chamber in the first configuration and the main chamber in the eighth configuration, such that the neck chamber is closed to prevent the jamming material from passing therethrough in the closed state, thereby transforming from the jamming attachment configuration to the suction attachment configuration.

Embodiment 20. The method of any one of the embodiments 16-19, wherein step (iv) comprises the steps of: (iv-i) configuring the assisted chamber control system in the first configuration and the main chamber control system in the eighth configuration; (iv-ii) configuring the assisted chamber control system in the fourth configuration, such that a pathway in the assisted chamber for the jamming granule is opened; (iv-iii) configuring the main chamber control system in the fifth configuration, such that the contact membrane inflates outward, as an inflated state; (iv-iv) configuring the assisted chamber in the first configuration, such that the neck chamber is closed to prevent the jamming material from passing therethrough in the closed state.

What is claimed is:

1. A soft gripper having a proximal side and a distal side, comprising:
   a main body comprising
      a suction cup portion that comprises an open end at the proximal side; and
      a neck portion that is connected with or extended from the suction cup portion; and
   a contact membrane, configured to seal the open end,
   wherein the neck portion comprises a neck chamber therein and the suction cup portion comprises a suction cup chamber therein, the neck chamber and the suction cup chamber together form a main chamber that is configured to be in gas communication with a first pneumatic source and to receive a jamming material, and
   wherein the neck portion further comprises at least one assisted chambers therein, each are disposed around the neck chamber and configured to be in gas communication with a second pneumatic source.

2. The soft gripper of claim 1, wherein the contact membrane is deformable between an inflated state, a flat state and a deflated state under control of the first pneumatic source, and
   wherein the neck chamber is deformable at least between an open state and closed state under control of the second pneumatic source, such that the soft gripper is configured to be switchable at least between a suction gripper configuration and a jamming gripper configuration.

3. The soft gripper of claim 1, further comprising a main chamber air tube in gas communication between the main chamber and the first pneumatic source; and
   at least one assisted chamber air tubes in gas communication between the at least one assisted chambers and the second pneumatic source.

4. The soft gripper of claim 1, wherein the main body is made of a first flexible material and the contact membrane is made of a second flexible material, wherein the first flexible material and/or the second flexible material is selected from a group consisting of: rubber, silicone rubber and combination thereof; and wherein the second flexible material is more flexible than the first flexible material.

5. The soft gripper of claim 4, wherein the first flexible material is selected from a group consisting of DragonSkin 30, DragonSkin 10, RTV Silicone rubber and combination thereof; and/or
   the second flexible material is selected from a group consisting of Ecoflex 30, Ecoflex 10 and combination thereof.

6. A fabrication method of the soft gripper as claimed in claim 4, comprising the following steps:
   (1) providing a main body mold sized and shaped to form the main body and curing a first flexible material into the main body mold, thereby forming the main body;
   (2) providing a membrane mold sized and shaped to form the contact membrane and curing a second flexible material into the membrane mold, thereby forming the membrane; and
   (3) attaching the contact membrane to the main body, thereby forming the soft gripper.

7. The method of claim 6, wherein the main body comprises an upper portion and a lower portion,
   wherein the step (1) comprises the steps of:
      (a) providing a lower main body mold for the lower portion and introducing a first flexible material into the lower main body mold, and curing the flexible material, thereby forming the lower portion; and
      (b) providing an upper main body mold for the upper portion and introducing a first flexible material into the second main body mold, disposing the lower portion to the second main body mold, and curing the first flexible material, thereby forming the upper portion onto the lower portion, such that the main body is formed.

8. The method of claim 7, wherein further comprising the step of:
   attaching or inserting a main chamber air tube and at least one assisted chamber air tubes to the main chamber and the at least one assisted chambers, respectively.

9. The method of claim 6, wherein the first flexible material and/or the second flexible material is selected from a group consisting of: rubber, silicone rubber and combination thereof; and wherein the second flexible material is more flexible than the first flexible material.

10. The method of claim 6, wherein the first flexible material is selected from a group consisting of DragonSkin 30, DragonSkin 10, RTV Silicone rubber and combination thereof, and/or the second flexible material is selected from a group consisting of Ecoflex 30 or Ecoflex 10.

11. The method of claim 6, wherein the step (3) attaching the contact membrane to the main body is performed with an adhesive that is selected from a group consisting of: silicone rubber adhesive, sil-Poxy, dopamine based adhesive nanocoatings, hyaluronic acid hydrogel adhesive and combination thereof.

12. The method of claim 6, wherein further comprising steps of: attaching the main chamber air tube, the at least one assisted chamber air tubes to the main chamber and the assisted chambers, respectively; and/or
   providing a jamming material into main chamber.

13. A pneumatic system for controlling the soft gripper as claimed in claim 1, comprising:
   an assisted chamber control system, comprising:
      a second pneumatic source, configured to provide a second pressure;
      a first valve connected between outlet of the second pneumatic source and the at least one assisted chambers; and
      a second value connected between inlet of the second pneumatic source and the at least one assisted chambers; and
   a main chamber control system, comprising:
      a first pneumatic source configured to provide a first pressure;
      a third valve connected between outlet of the first pneumatic source and the main chamber; and a fourth value connected between inlet of the first pneumatic source and the main chamber.

14. The pneumatic system of claim 13, wherein the first valve, the second valve, the third valve and/or the fourth valve is a 2/3-way electric valve switchable between On status and Off status.

15. The pneumatic system of claim 13, wherein the assisted chamber control system comprises a first configuration, a second configuration, a third configuration, and a fourth configuration, wherein the first configuration comprises the first valve being configured in On status and the second valve being configured in Off status, the second pneumatic source creates a positive, second pressure to the at least one assisted chambers, such that the at least one assisted chambers expands towards the neck chamber, thereby closing the neck chamber to prevent the jamming material from passing therethrough, as a closed state;

wherein the second configuration comprises the first valve being configured in Off status and the second valve being configured in On status, the second pneumatic source creates a negative, second pressure to the at least one assisted chambers, such that the at least one assisted chambers contract away from the neck chamber, allowing the jamming material passing therethrough, as an open state;

wherein the third configuration comprises the first valve and the second valve being configured in the Off status, the second pressure within the assisted chambers is maintained; and wherein the fourth configuration comprises the first valve and the second valve being configured in the On status, the second pressure within the at least one assisted chambers is substantially equal to atmospheric pressure; and wherein the main chamber control system comprises a fifth configuration, a sixth configuration, a seventh configuration, an eighth configuration, wherein the fifth configuration comprises the third valve being configured in On status and the fourth valve being configured in Off status, the first pneumatic source creates a positive, first pressure to the main chamber, such that the contact membrane inflates outward, as an inflated state;

wherein the sixth configuration comprises the third valve being configured in Off status and the fourth valve being configured in On status, the first pneumatic source creates a negative, first pressure to the main chamber, such that the contact membrane deflates inward, as a deflated state;

wherein the seventh configuration comprises the third valve and the fourth valve being configured in the Off status, the first pressure within the main chamber is maintained; and wherein the eighth configuration comprises the third valve and the fourth valve being configured in the On status, the first pressure within the main chamber is substantially equal to atmospheric pressure.

16. A method of controlling the soft gripper as claimed in claim 1 using the pneumatic system as claimed in claim 15, comprising one or more of the steps of:

(i) grasping a target object in a jamming attachment configuration;

(ii) grasping a target object in a suction attachment configuration;

(iii) transforming from the jamming attachment configuration to the suction attachment configuration; and/or (iv) transforming from the suction gripper configuration to the jamming gripper configuration.

17. The method of claim 16, wherein the step (i) comprises the steps of:

(i-i) configuring the assisted chamber control system in the fourth configuration and the main chamber control system in eighth configuration, such that the soft gripper is in resting state;

(i-ii) configuring the main chamber control system in fifth configuration, such that the contact membrane inflates outward as the inflated state;

(i-iii) configuring the assisted chamber control system in the first configuration, such that the neck chamber is closed to prevent the jamming material from passing therethrough in the closed state;

(i-iv) disposing the soft gripper proximate to a target object until the target object is fully contacted with the inflated contact membrane;

(i-v) configuring the main chamber control system in the seventh configuration, such that the first pressure within the main chamber is maintained;

(i-vi) configuring the main chamber control system in the sixth configuration, creating a negative, first pressure to the main chamber; and (i-vii) configuring the main chamber control system in the seventh configuration, such that the first pressure within the main chamber is maintained, thereby jamming attachment for grasping target object is performed.

18. The method of claim 16, wherein the step (ii) comprises the steps of:

(ii-i) configuring the assisted chamber control system in the fourth configuration and the main chamber control system in the eighth configuration, such that the soft gripper is in resting state;

(ii-ii) configuring the main chamber control system in the six configuration, such that the contact membrane deflates inward in the deflated state;

(ii-iii) configuring the assisted chamber control system in the first configuration and the main chamber control system in the fifth configuration, such that closing the neck chamber to prevent the jamming material from passing therethrough, as a closed state, and the contact membrane inflates outward, as an inflated state;

(ii-iv) disposing the soft gripper proximate to a target object until the target object is fully contacted with the contact membrane;

(ii-v) configuring the main chamber control system in the seventh configuration, such that the first pressure within the main chamber is maintained;

(ii-vi) configuring the main chamber control system in the sixth configuration, such that the contact membrane deflates inward, as a deflated state; and (ii-vii) configuring the main chamber control system in the seventh configuration, such that the first pressure within the main chamber is maintained, thereby suction attachment for grasping target object is performed.

19. The method of claim 16, wherein step (iii) comprises the steps of:

(iii-i) configuring the assisted chamber control system in the first configuration and the main chamber control system in the fifth configuration;

(iii-ii) configuring the assisted chamber control system in the fourth configuration or the sixth configuration, such that the neck chamber is open;

(iii-iii) configuring the main chamber in the sixth configuration, such that the contact membrane deflates inward in the deflated state, thereby the jamming material being pushed to the main chamber; and (iii-iv) configuring the assisted chamber in the first configuration and the main chamber in the eighth configuration, such that the neck chamber is closed to prevent the jamming material from passing therethrough in the closed state, thereby transforming from the jamming attachment configuration to the suction attachment configuration.

20. The method of claim 16, wherein step (iv) comprises the steps of:

(iv-i) configuring the assisted chamber control system in the first configuration and the main chamber control system in the eighth configuration;

(iv-ii) configuring the assisted chamber control system in the fourth configuration, such that a pathway in the assisted chamber for the jamming granule is opened;

(iv-iii) configuring the main chamber control system in the fifth configuration, such that the contact membrane inflates outward, as an inflated state;

(iv-iv) configuring the assisted chamber in the first configuration, such that the neck chamber is closed to prevent the jamming material from passing therethrough in the closed state.

\*  \*  \*  \*  \*